(12) United States Patent
Onogi

(10) Patent No.: US 6,341,826 B2
(45) Date of Patent: Jan. 29, 2002

(54) ANTISKID BRAKE CONTROL SYSTEM FOR AUTOMOTIVE VEHICLES

(75) Inventor: Nobuyoshi Onogi, Nagoya (JP)

(73) Assignee: Denso Corporation, Kariya (*) Notice: Subject to any disclaimer, the term of this patent is extended or adjusted under 35 U.S.C. 154(b) by 0 days.

(21) Appl. No.: 09/740,888

(22) Filed: Dec. 21, 2000

(30) Foreign Application Priority Data

Dec. 21, 1999 (JP) .......................................... 11-363144
Nov. 9, 2000 (JP) .......................................... 12-342117

(51) Int. Cl.$^7$ .............................. B60T 8/58; B60T 8/66; B60T 8/52
(52) U.S. Cl. .................... 303/112; 188/181 T; 303/166; 303/199; 303/194; 701/79; 701/71; 180/197
(58) Field of Search ................................. 303/112, 199, 303/166, 150, 146, 174, 163, 195, 194, 196, DIG. 3, DIG. 4, 191; 188/181 T; 180/197; 701/71, 84, 70, 78, 79, 80, 74, 76, 83

(56) References Cited

U.S. PATENT DOCUMENTS

| 4,794,538 | A | | 12/1988 | Cao et al. |
| 5,588,721 | A | | 12/1996 | Asano et al. |
| 6,122,585 | A | * | 9/2000 | Ono et al. ................... 303/166 |

FOREIGN PATENT DOCUMENTS

| EP | 891 904 | 1/1999 |
| JP | 9-52572 | 2/1997 |
| JP | 2618379 | 3/1997 |
| JP | 9-207747 | 8/1997 |
| JP | 11-78843 | 3/1999 |
| JP | 11-291883 | 10/1999 |

OTHER PUBLICATIONS

Zegelaar Et Al: "Dynamic Tyre Responses to Brake Torque Variations", Verhicle System Dynamics Supplement 27 (1997), pp 65–79.

* cited by examiner

Primary Examiner—Douglas C. Butler
(74) Attorney, Agent, or Firm—Pillsbury Winthrop LLP

(57) ABSTRACT

An antiskid brake system for an automotive vehicle is provided which includes a parameter determining circuit and a braking condition determining circuit. The parameter determining circuit determines a parameter reflecting on brake torque applied to a wheel of the vehicle. The braking condition determining circuit compares the phase of a change in speed of the wheel with the phase of a change in the parameter to determine a phase delay of the change in speed of the wheel and determines the braking condition based on the phase delay, thereby allowing a wheel skid used in the antiskid brake control precisely without employing parameters such as vehicle speed and wheel speed as employed in conventional antiskid brake systems.

10 Claims, 18 Drawing Sheets

FIG. 2(a) PRIOR ART
BRAKE FORCE
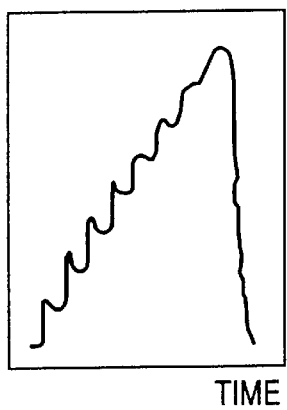
TIME
FIG. 2(b) PRIOR ART
WHEEL SPEED
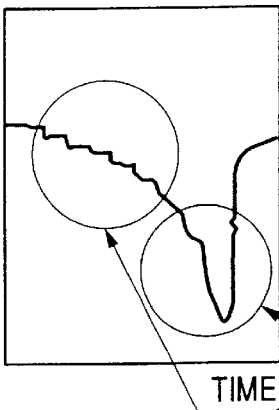
TIME
RANGE1
FIG. 2(c) PRIOR ART
$\mu$-CHARACTERISTICS
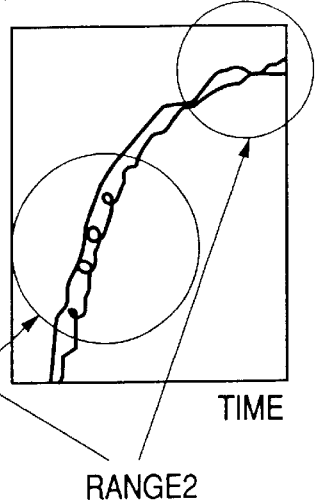
TIME
RANGE2
FIG. 3 PRIOR ART
W/C PRESSURE Pb
WHEEL SPEED Vw
WHEEL ACCELERATION Vw'
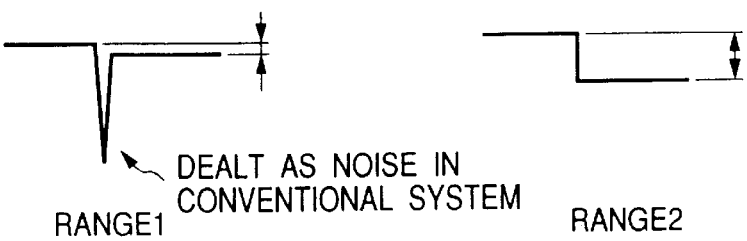
DEALT AS NOISE IN CONVENTIONAL SYSTEM
RANGE1          RANGE2

FIG. 4

| | MODEL | CHARACTERISTICS IN BRAKE FORCE-INCREASING MODE | CHARACTERISTICS OF SPEED CHANGE |
|---|---|---|---|
| RANGE 1 | TIRE STIFFNESS | | 1st-ORDER LAG (=SLIP RATIO CHANGE)<br><br>① PHASE IS DELAYED AS APPROACHING PEAK<br><br>② VIBRATION NOISE IS GREAT BECAUSE OF EXTENSION OF TIRE SPRING |
| RANGE 2 | ③ INCREASE IN ACCELERATION | | 2nd-ORDER LAG SPEED RATE CHANGE (=ACCELERATION CHANGE) |

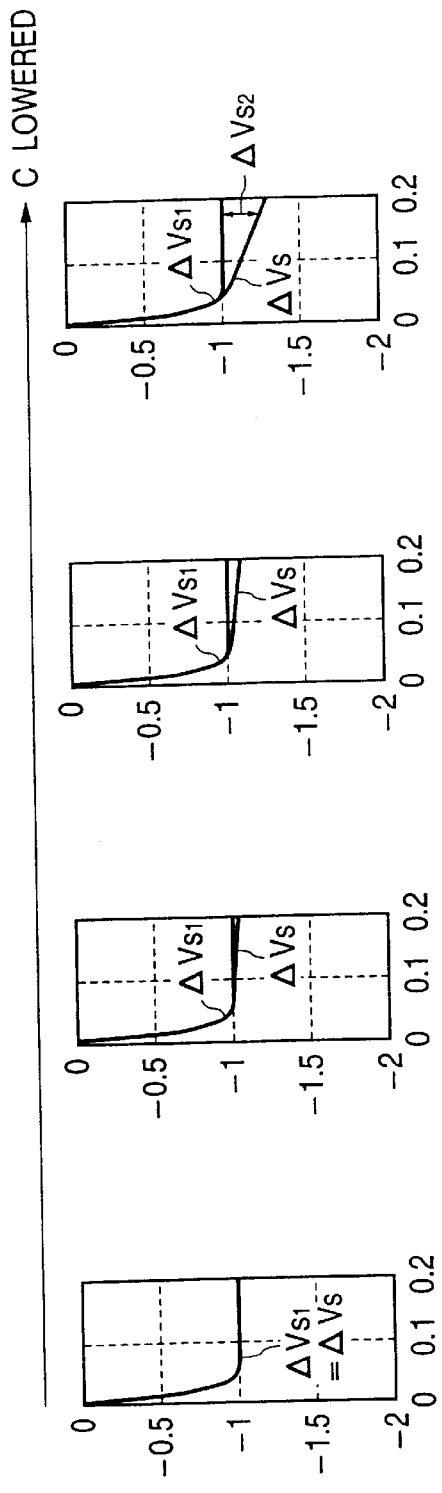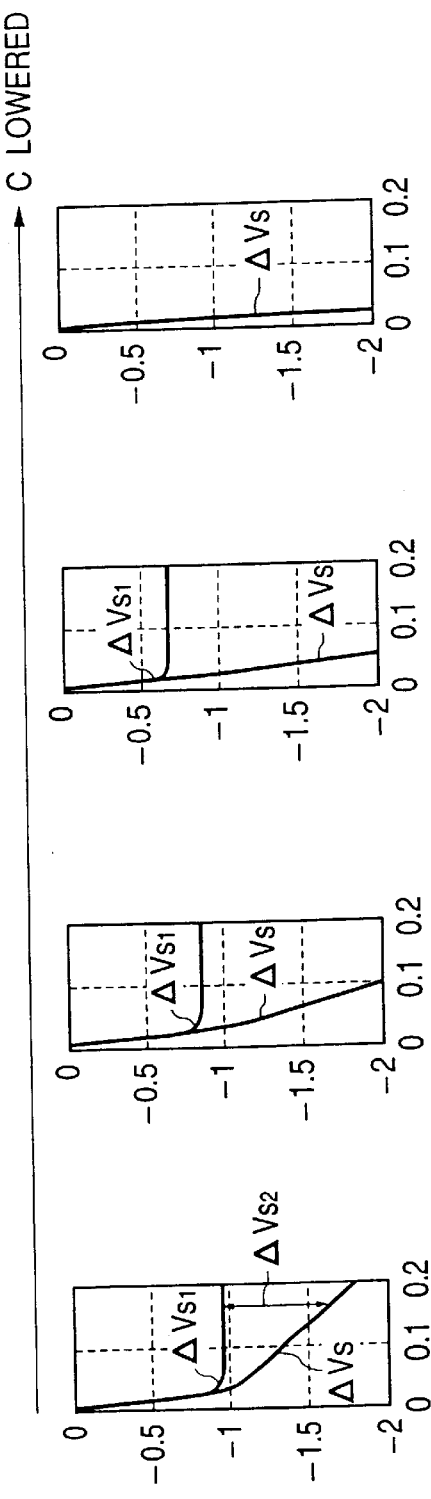

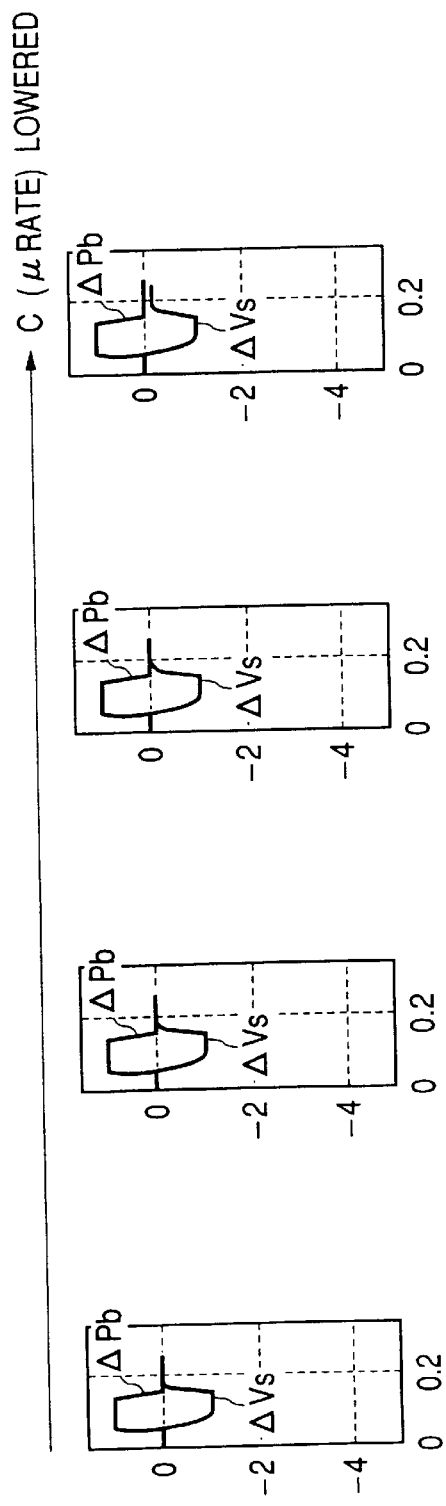
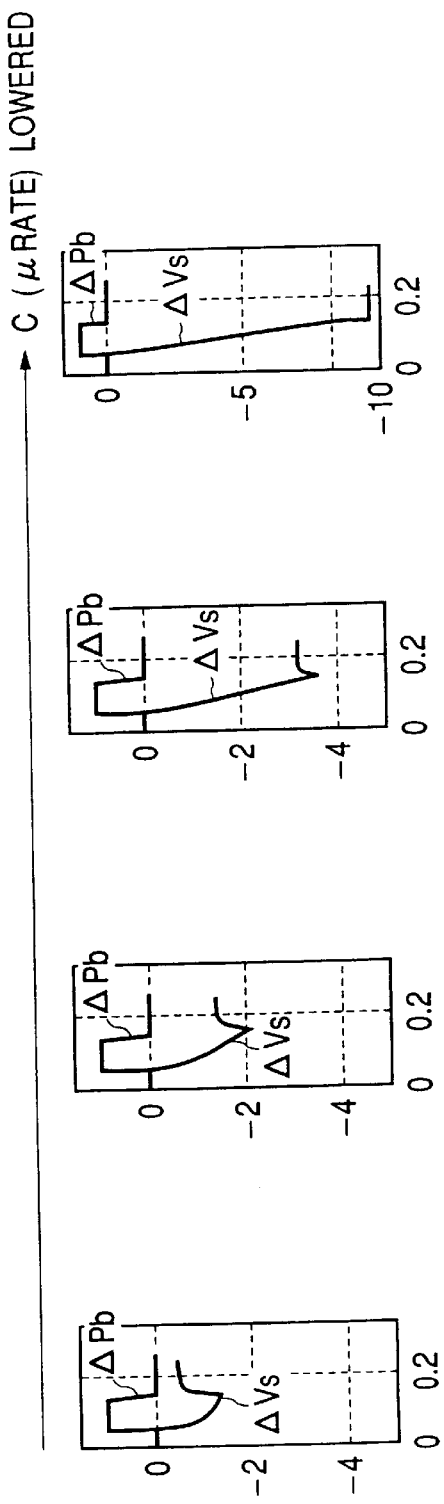
FIG. 7(a)  FIG. 7(b)  FIG. 7(c)  FIG. 7(d)
FIG. 7(e)  FIG. 7(f)  FIG. 7(g)  FIG. 7(h)

PRESSURE-INCREASING PATTERN ①

PRESSURE-REDUCING PATTERN ②

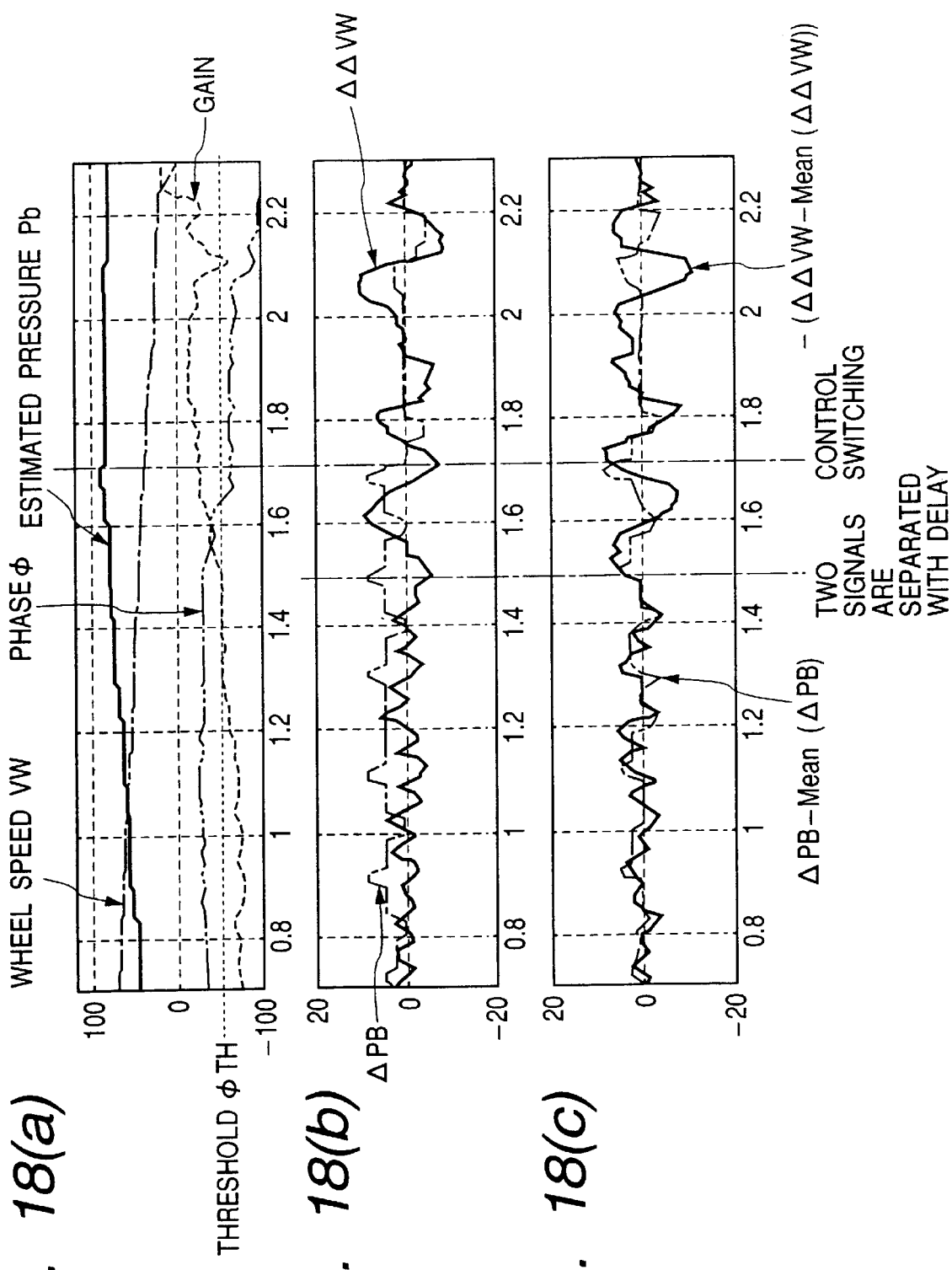

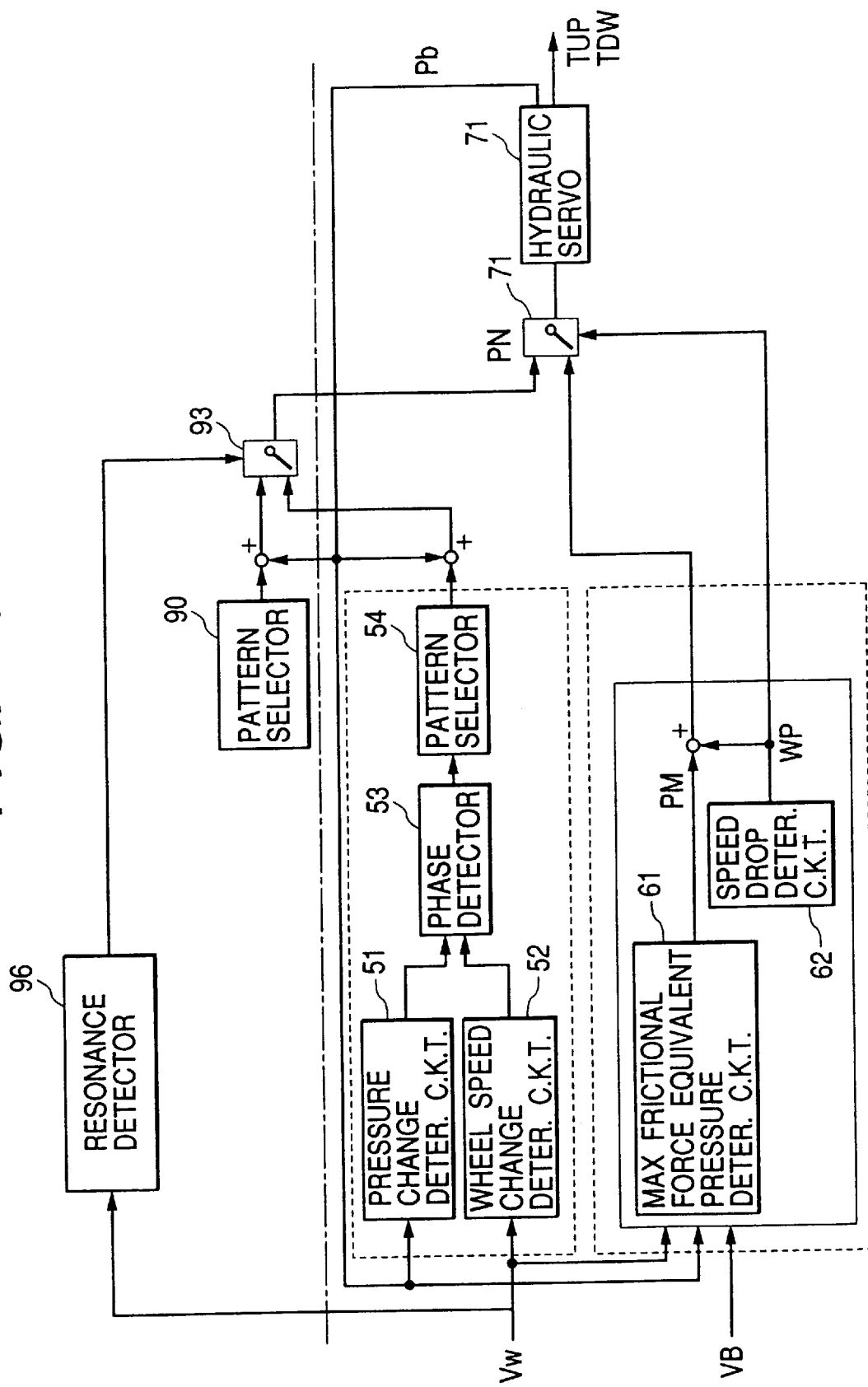

ANTISKID BRAKE CONTROL SYSTEM FOR AUTOMOTIVE VEHICLES

BACKGROUND OF THE INVENTION

1 Technical Field of the Invention

The present invention relates generally to an antiskid brake system for automotive vehicles designed to control the brake force applied to each wheel of the vehicle during deceleration thereof.

2 Background Art

Antiskid brake systems (ABSs) are well known as a brake control system which controls the brake pressure during deceleration of an automotive vehicle. The antiskid brake systems work to control brake forces acting on wheels based on the fact that an increase in slip ratio S will cause a rate of change in coefficient of adhesion $\mu$ between tire and road (it is in effect the coefficient of friction), as shown in FIG. 1(a), to change greatly following a target slip ratio Sm (e.g., 10%). In practice, the antiskid brake systems determine the timing where a brake pressure (i.e., a brake fluid pressure) applied to each wheel is increased or decreased, as shown in FIG. 1(b), based on the wheel speed Vw and the wheel acceleration Vw' and regulate the brake pressure acting on each wheel.

The wheel acceleration $Vw^{**'}$ of each wheel is usually given by the equation (1) below.

$$I/rVw^{'} = F\text{max} - K\text{pad} \cdot Pb^{} \quad (1)$$

where the suffix "" expresses FR, FL, RR, and RL standing for a front right, a front left, a rear right, and a rear left wheel, respectively, I is the moment of inertia of each wheel, r is the radius of tire, Fmax is a maximum road-tire frictional force, Kpad is a constant, and $Pb^{}$ is a wheel cylinder pressure.

The product $K\text{pad} \cdot Pb^{}$ represents the brake force. As apparent from the equation (1), in a range 1, as shown in FIG. 1(a), where the slip ratio is smaller, an increase in brake force will cause the coefficient of friction to increase, so that the wheel acceleration $Vw^{'}$ hardly changes, but when the brake force exceeds the maximum frictional force Fmax (i.e.; in a range 2), it reflects directly on the wheel acceleration $Vw^{**'}$.

The antiskid brake systems usually determine the speed of a vehicle body VB (referred to as a vehicle speed below) based on the greatest of four wheel speeds and regulate the brake pressure so as to bring a slip ratio, as determined by a difference between the vehicle speed VB and the wheel speed $Vw^{}$, into agreement with a target slip ratio (e.g., 10%) in which the brake force reaches a peak thereof. For instance, when the difference between the vehicle speed VB and the wheel speed $Vw^{}$ is great, the antiskid brake systems decrease the brake pressure.

Usually, a maximum deceleration of the vehicle when being brought to rest depends upon the condition of a road surface. In a case of a high friction road such as an asphalt road, a maximum of 1.0 G is reached. The determination of whether the coefficient of friction exceeds the peak or not must, therefore, wait until a higher deceleration as much as 1.0 G is reached. This, however, results in an undesirable drop in wheel speed, leading to a great wheel slippage.

It is difficult to derive the vehicle speed from speeds of four wheels accurately. The slip ratio in which the coefficient of friction reaches the peak depends upon the type of road surface. It is, therefore, impossible to precisely determine the speed producing the slip ratio in which the brake force reaches a maximum value (i.e., a target speed). Specifically, a shift in the target speed may result in a delay of the brake control, so that the wheel speeds drop undesirably, thereby leading to a great wheel slippage.

SUMMARY OF THE INVENTION

It is therefore a principal object of the invention to avoid the disadvantages of the prior art.

It is another object of the invention to provide an antiskid brake system capable of determining a wheel skid precisely without using parameters such as vehicle speed and wheel speeds as employed in conventional antiskid brake systems.

It is a further object of the invention to provide a brake condition determining device capable of determining a braking condition of a vehicle accurately.

According to one aspect of the invention, there is provided an antiskid brake system for a vehicle. The system includes: (a) a wheel speed determining circuit determining a speed of a wheel of the vehicle; (b) a parameter determining circuit determining a parameter reflecting on brake torque applied to the wheel of the vehicle; (c) a braking condition determining circuit comparing a phase of a change in speed of the wheel determined by the wheel speed determining circuit with a phase of a change in parameter determined by the parameter determining circuit to determine a phase delay of the change in speed of the wheel and determining a braking condition based on the phase delay; and (d) an antiskid brake controlling circuit performing antiskid brake control based on the braking condition determined by the braking condition determining circuit.

In the preferred mode of the invention, the braking condition determining circuit increases the parameter in the form of a pulse and determines the braking condition the change in speed of the wheel as a function of a step change in the parameter.

The braking condition determining circuit determines the braking condition based on a fact that the phase of the change in speed of the wheel is delayed from the phase of the change in parameter determined by the parameter determining circuit as a slip ratio increases.

The parameter determined by the parameter determining circuit is a pressure of hydraulic fluid supplied cyclically to a wheel cylinder of the vehicle in the form of a pulse. A cycle in which the pressure of hydraulic fluid is supplied to the wheel cylinder is lower than a cycle of resonant vibrations occurring at a suspension system of the vehicle depending upon a type of the vehicle.

The wheel speed determining circuit provides a signal indicative of the speed of the wheel to the braking condition determining circuit. A frequency higher than a frequency of resonant vibrations occurring in a suspension system of the vehicle is removed from the signal indicative of the speed of the wheel.

The change in speed of the wheel is one of a first parameter representing a difference between instant values of the speed of the wheel sampled at a given time interval cyclically and a second parameter representing a difference between instant values of the first parameter sampled at the given time interval cyclically.

The change in speed of the wheel may alternatively be one of a first parameter that is a first difference between instant values of the speed of the wheel sampled at a given time interval cyclically minus a mean value of the first differences sampled for a given period of time and a second parameter that is a second difference between instant values of the first parameter sampled at the given time interval cyclically minus the second differences sampled for a given period of time.

The change in parameter determined by the parameter determining circuit is a change in pressure of hydraulic fluid supplied to a wheel cylinder of the vehicle in a given period of time.

The change in parameter determined by the parameter determining circuit may alternatively be the change in pressure of hydraulic fluid supplied to a wheel cylinder of the vehicle in a given period of time minus a means values of the changes in pressure of the hydraulic fluid for a given period of time.

According to another aspect of the invention, there is provided a braking condition determining device for a vehicle which comprises: (a) a wheel speed determining circuit determining a speed of a wheel of the vehicle; (b) a parameter determining circuit determining a parameter reflecting on brake torque applied to the wheel of the vehicle; and (c) a braking condition determining circuit comparing a phase of a change in speed of the wheel determined by the wheel speed determining circuit with a phase of a change in parameter determined by the parameter determining circuit to determine a phase delay of the change in speed of the wheel and determining a braking condition of the wheel based on the phase delay.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) shows a change in brake force in a conventional antiskid brake control;

FIG. 2(b) shows a change in wheel speed in a conventional antiskid brake control;

FIG. 2(c) shows a change in tire-road adhesion $\mu$ in a conventional antiskid brake control;

FIG. 3 shows changes in wheel speed Vw and acceleration Vw' in a conventional antiskid brake control;

FIG. 4 shows models expressing changes in brake force and slip speed in ranges 1 and 2;

Figure 1A:
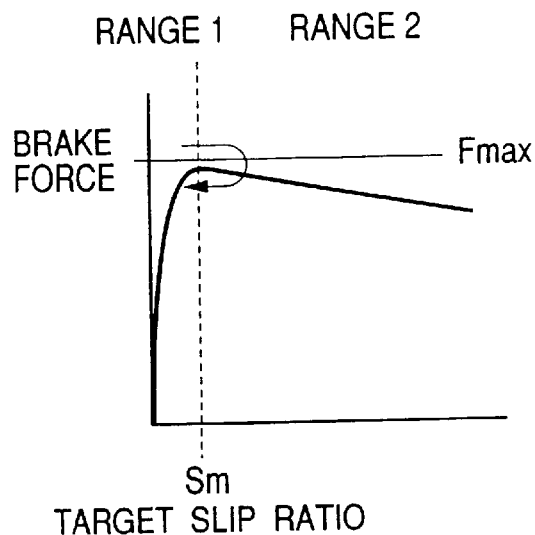
FIG. 1(a) shows a relation between the brake force and the slip ratio in a conventional antiskid brake system.
Figure 1B:
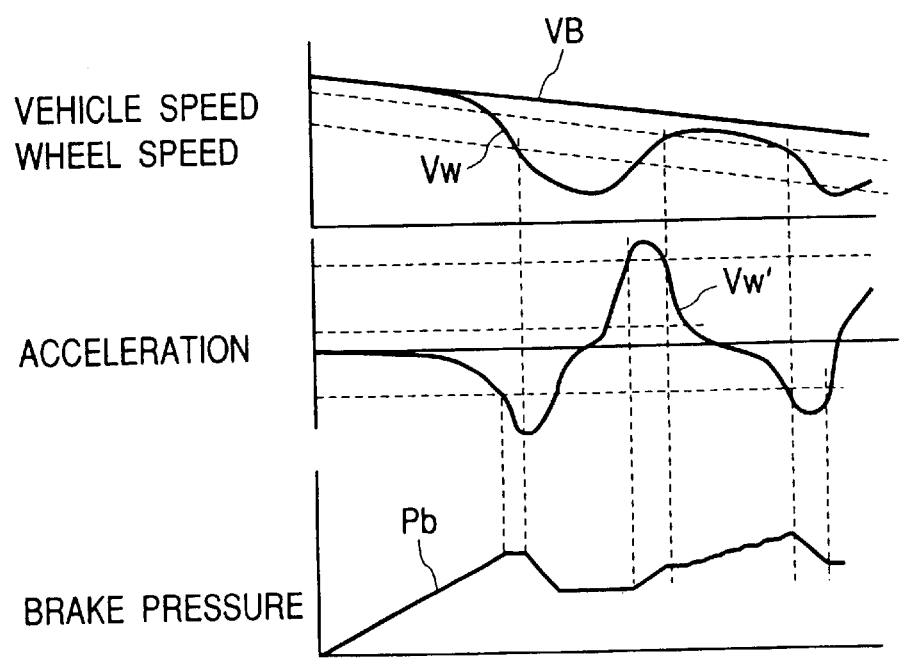
FIG. 1(b) shows changes in wheel speed, vehicle speed, deceleration, and brake pressure under conventional antiskid brake control.
Figure 5A:
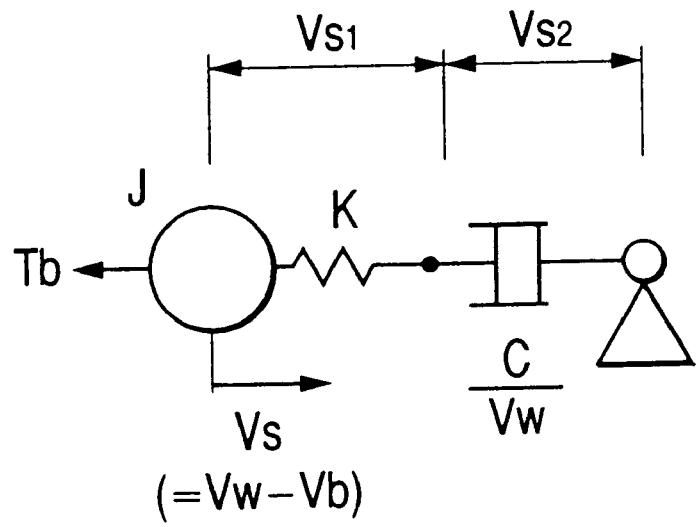
Figure 5B:
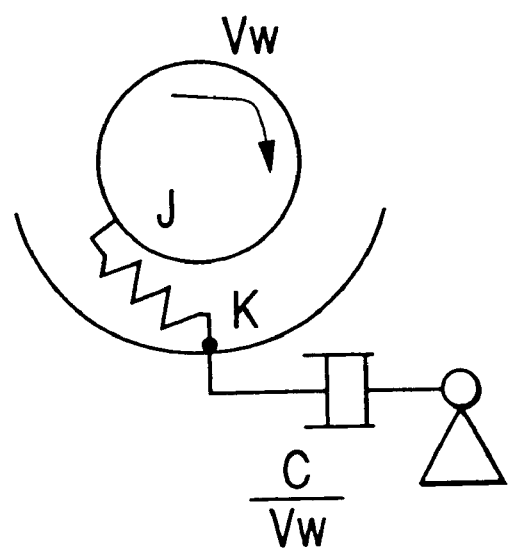
Figure 8:
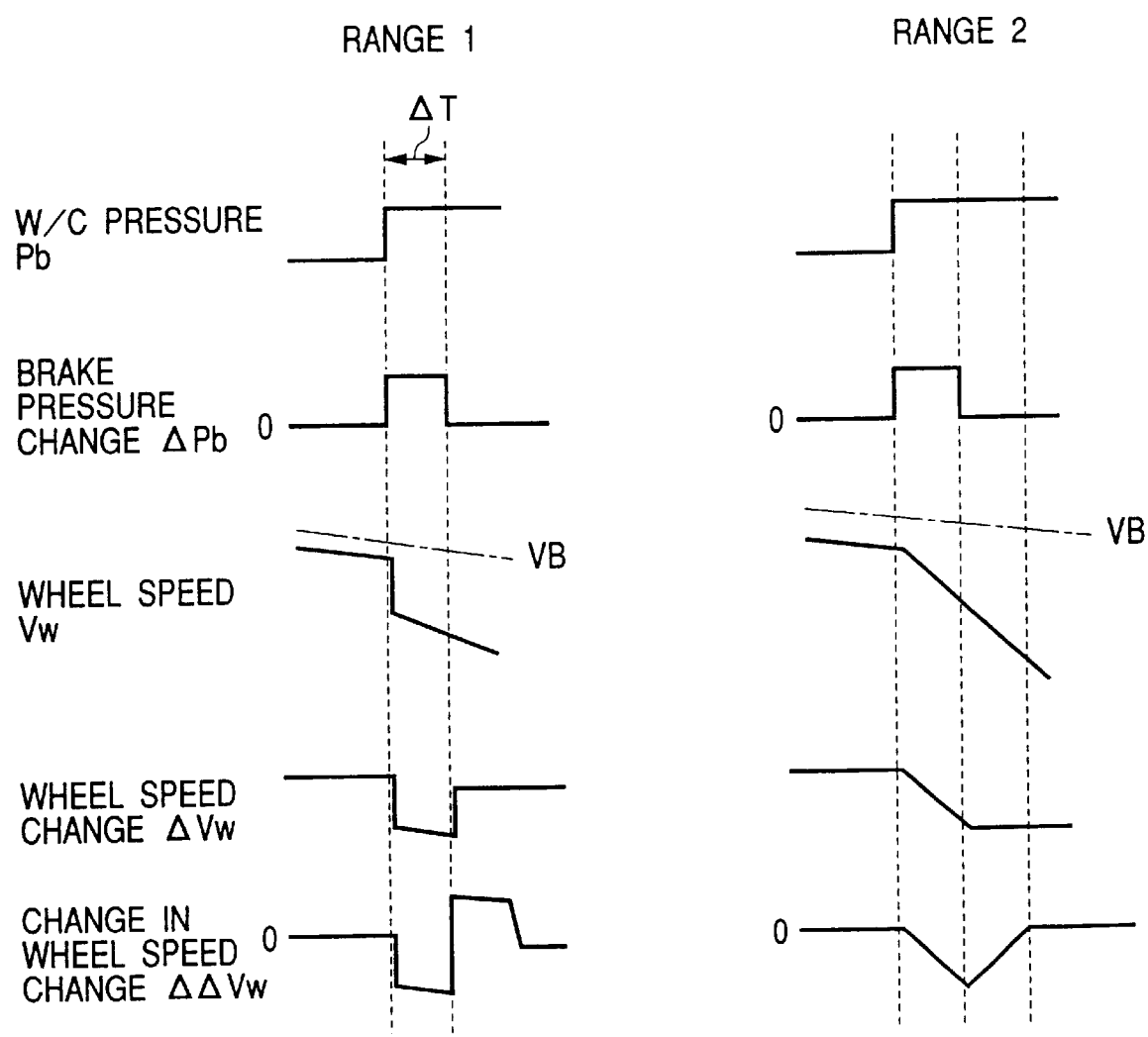
Figure 9:
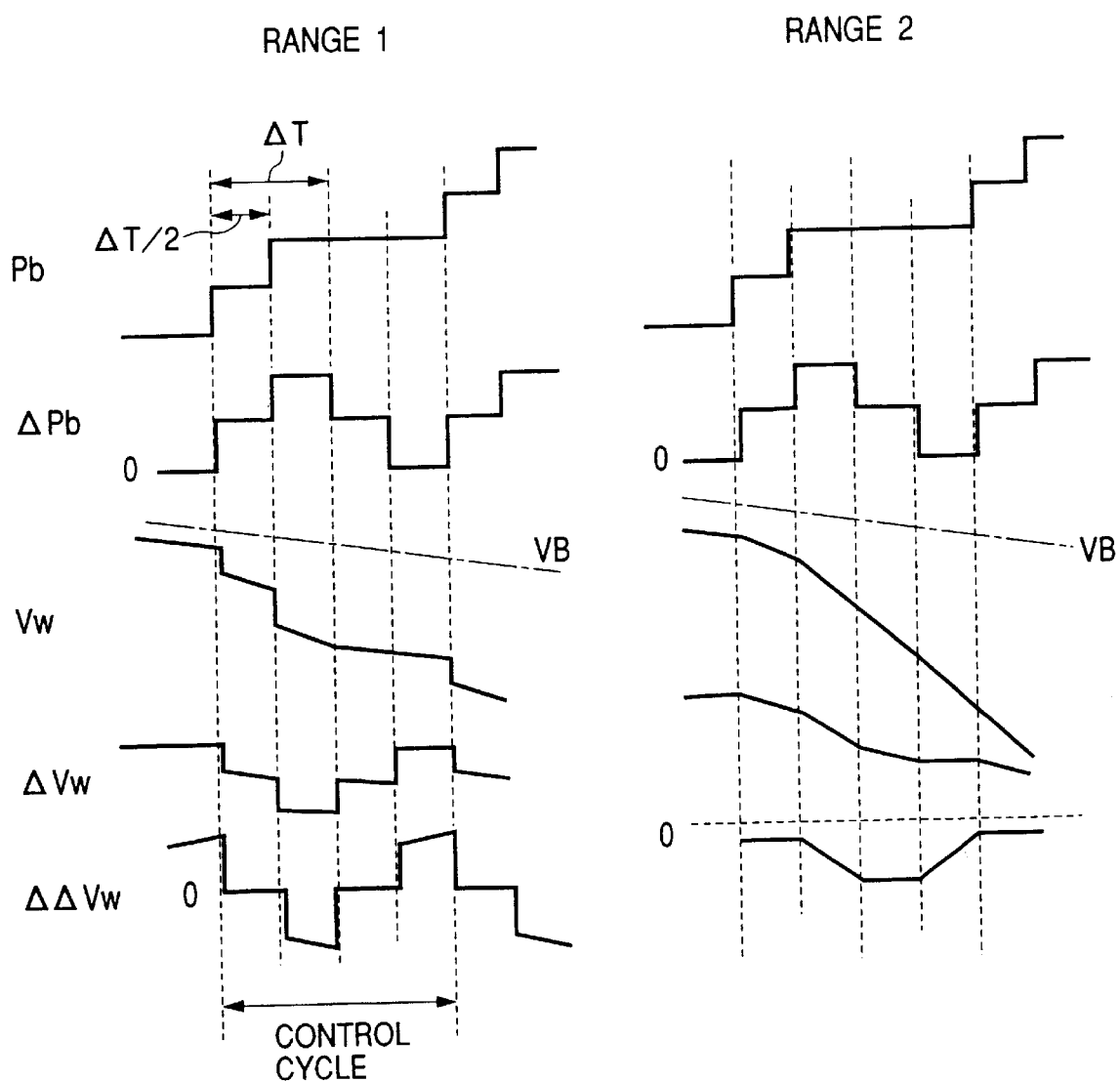
Figure 10:
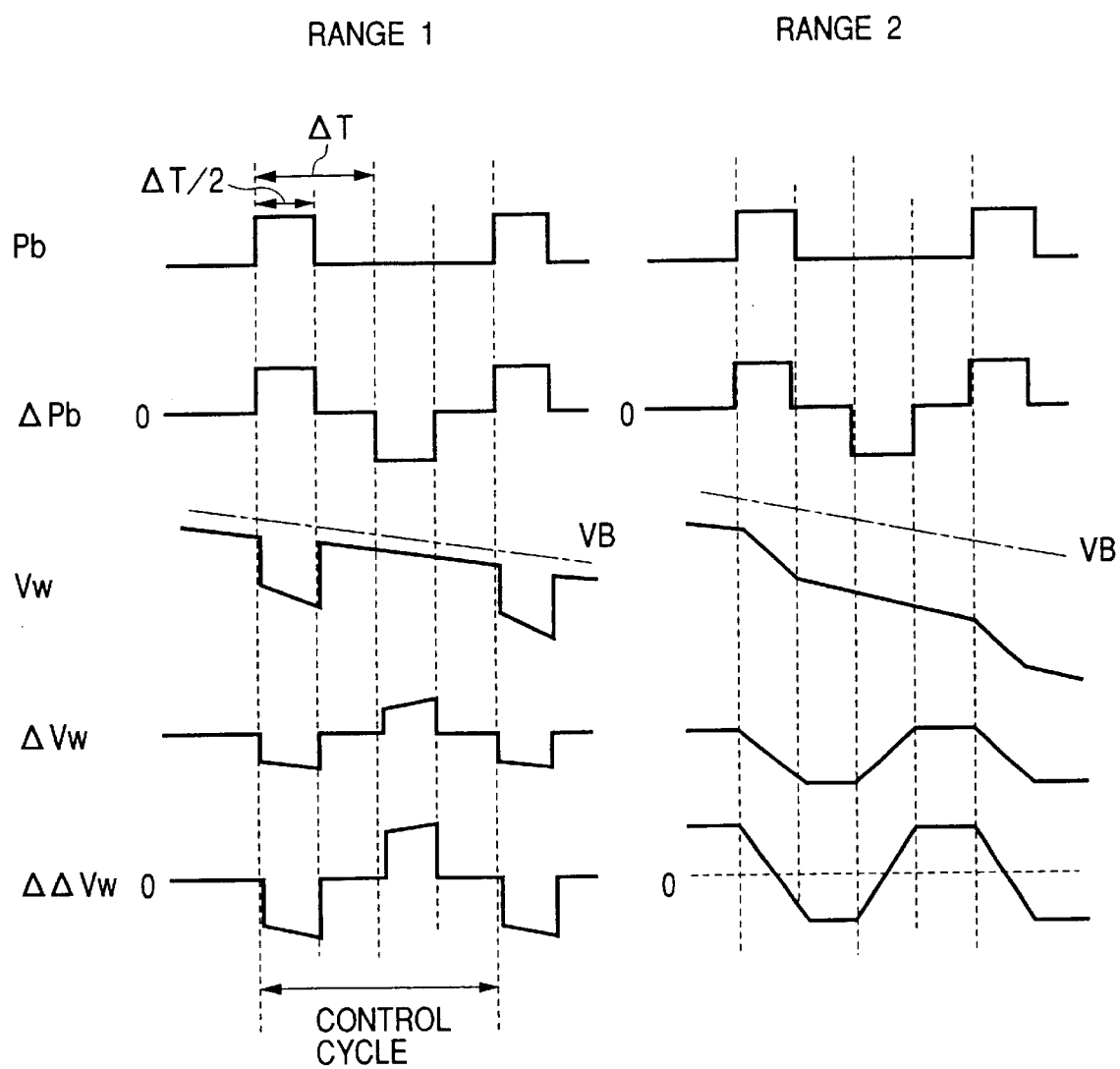
Figure 11A:
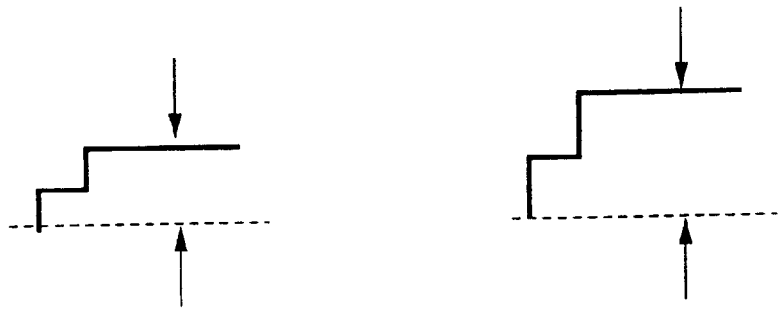
Figure 11B:
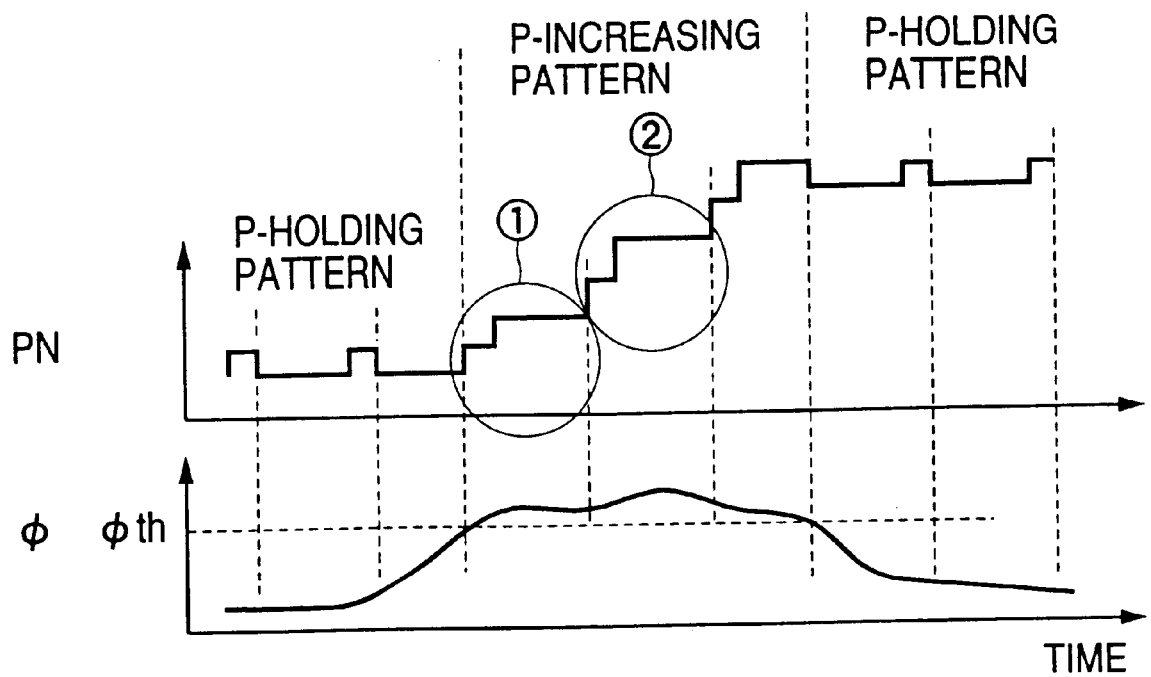
Figure 12:
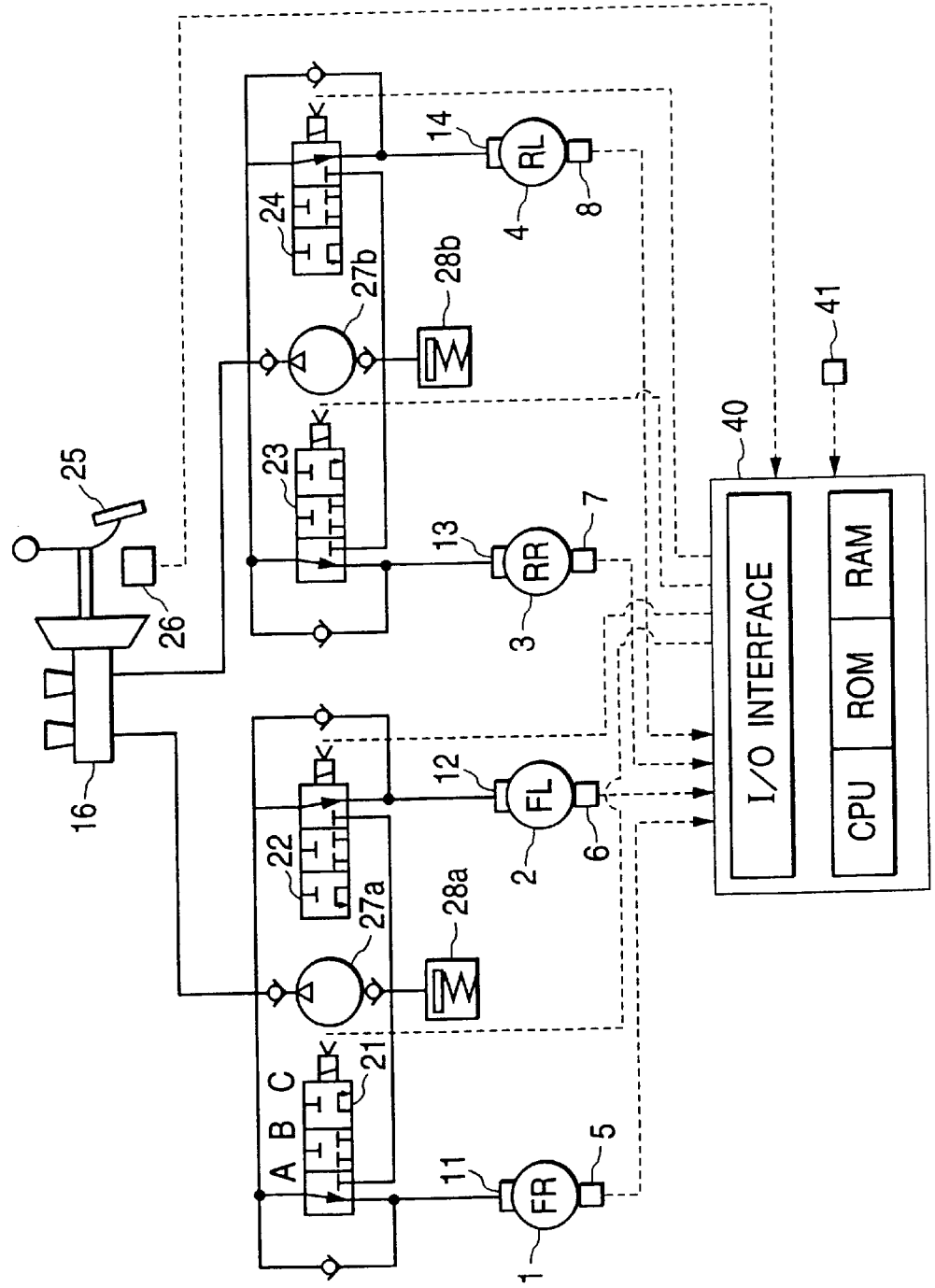
Figure 13:
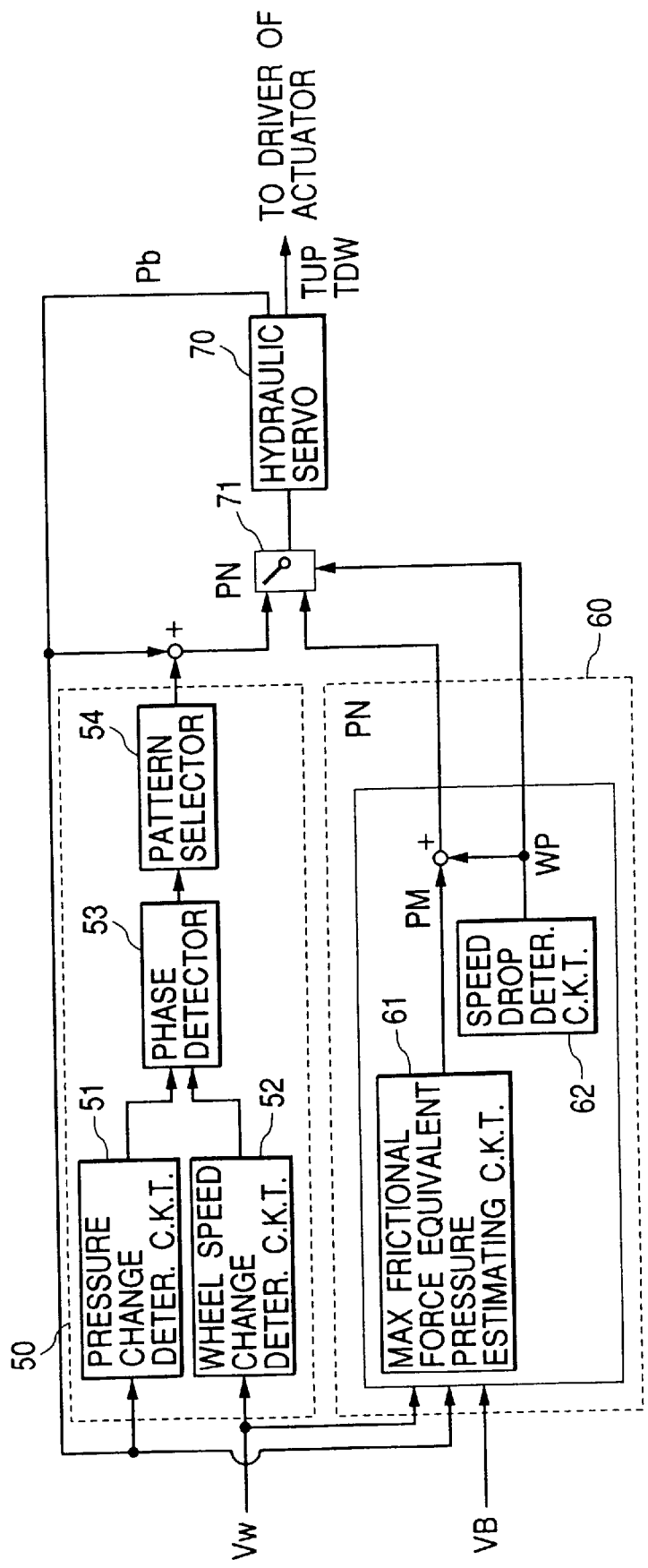
Figure 14:
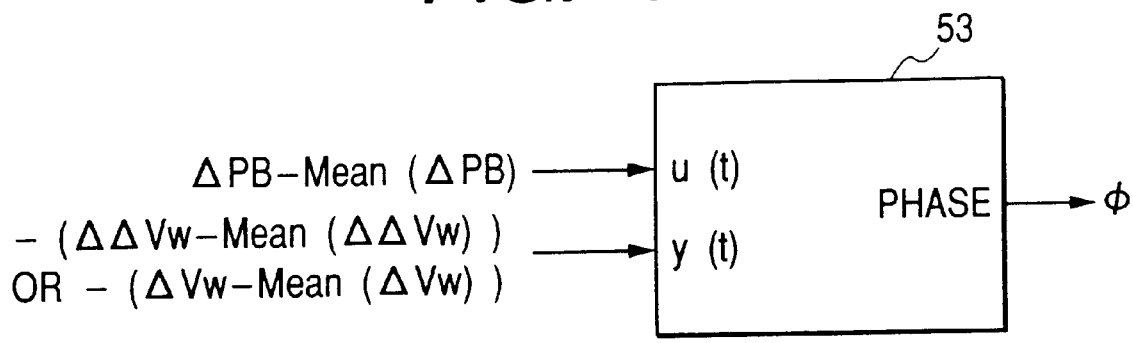
Figure 15:
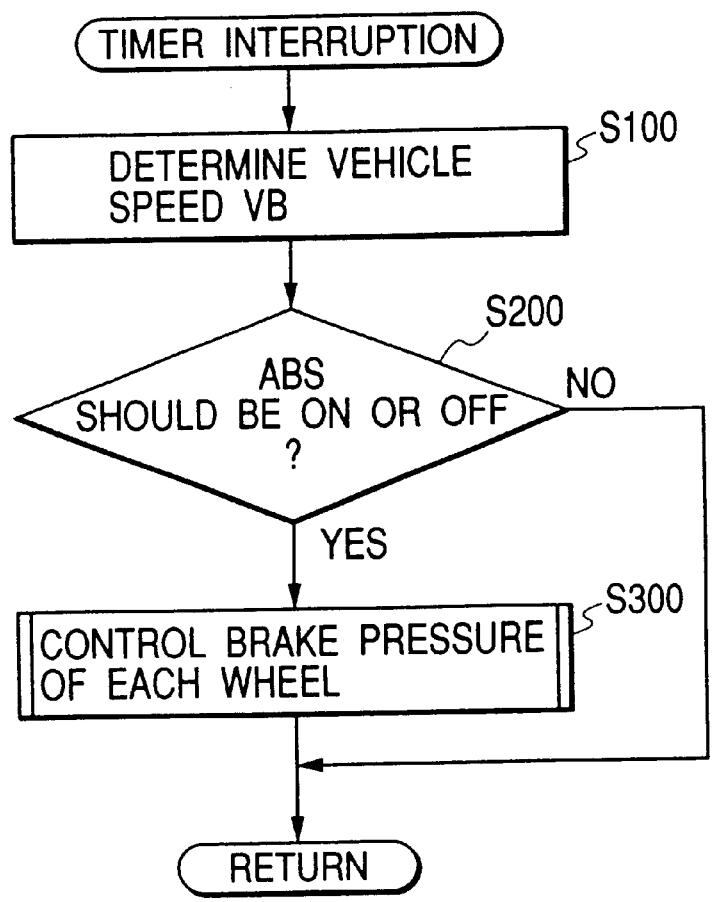
Figure 16:
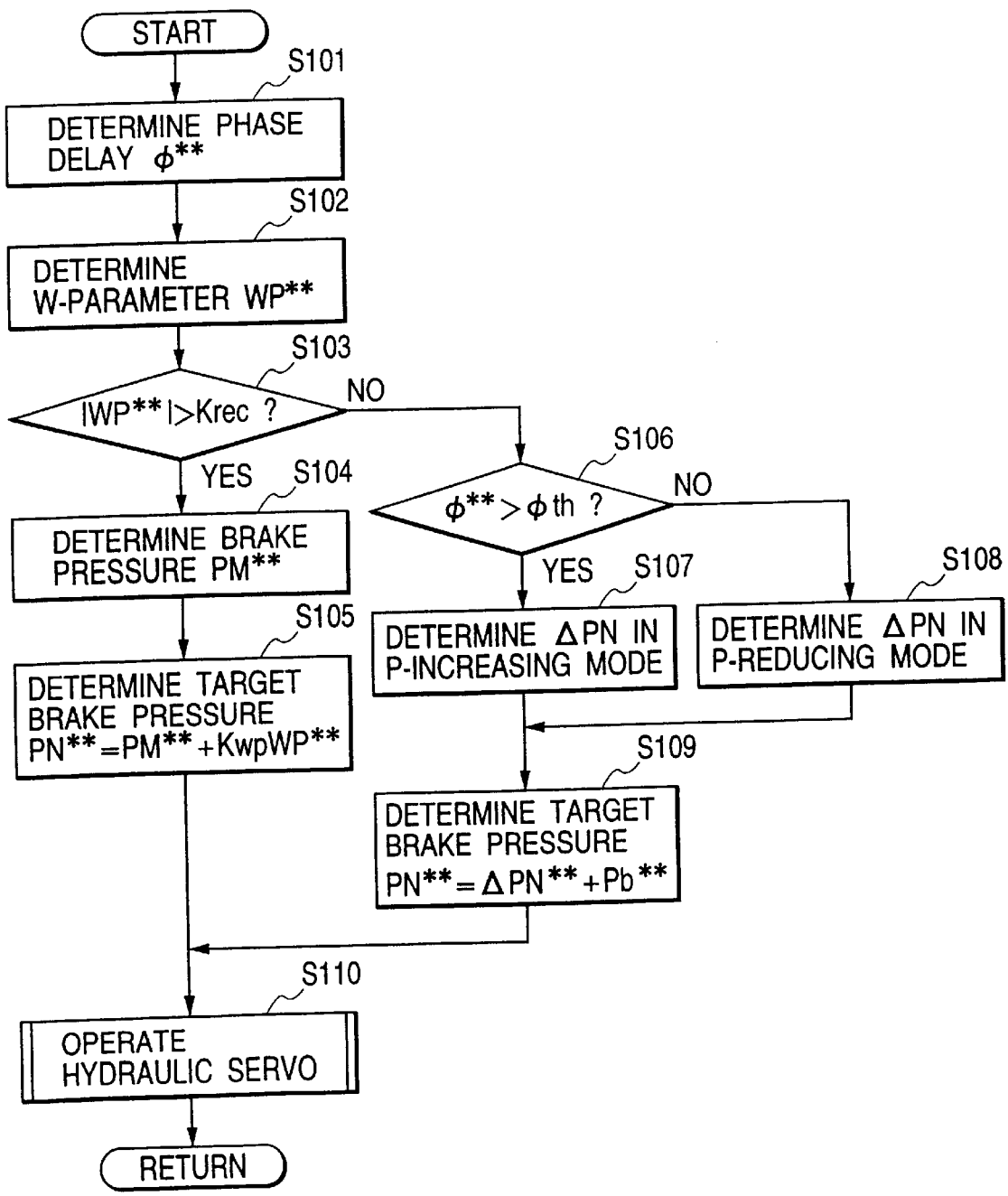
Figure 17:
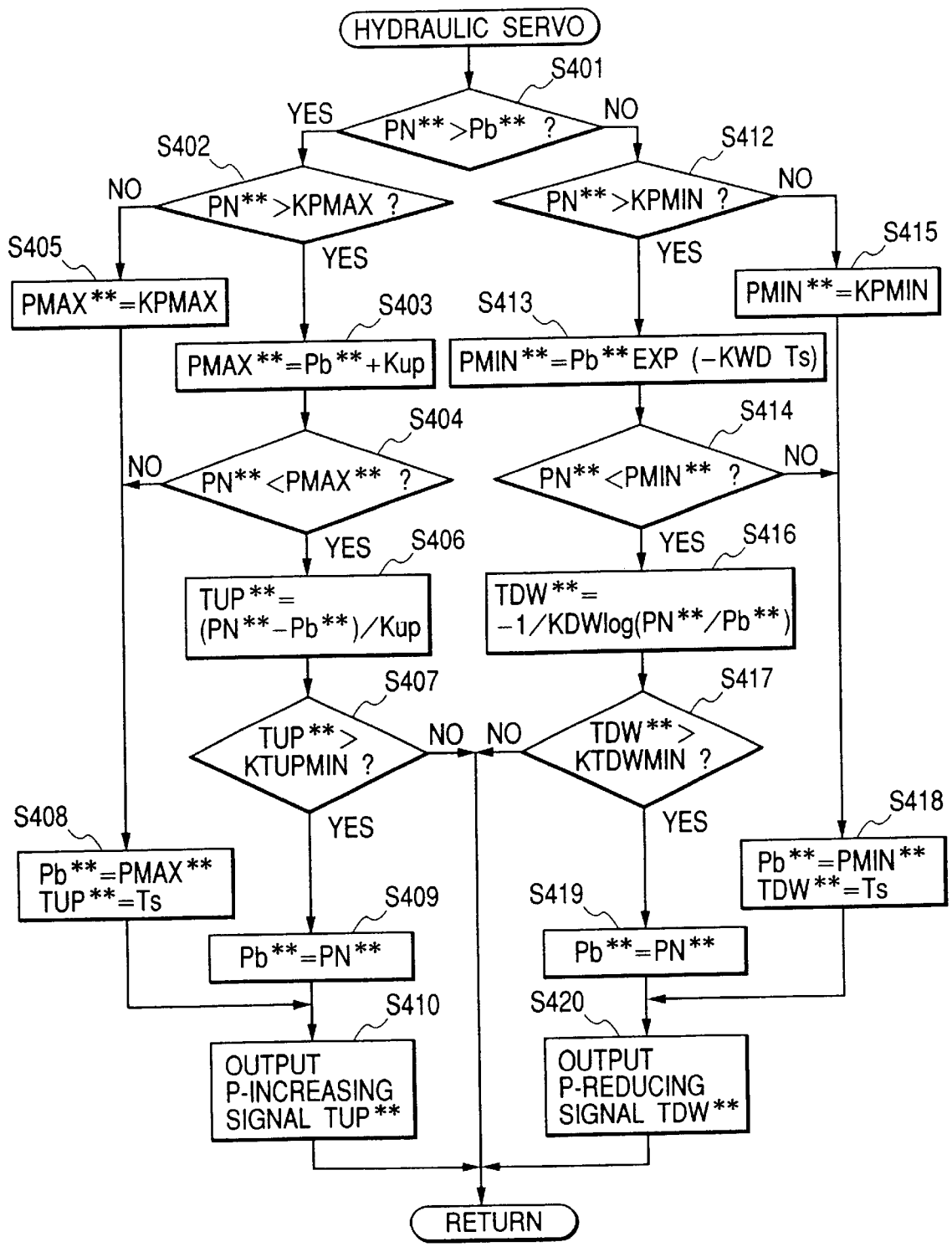
Figure 19A:
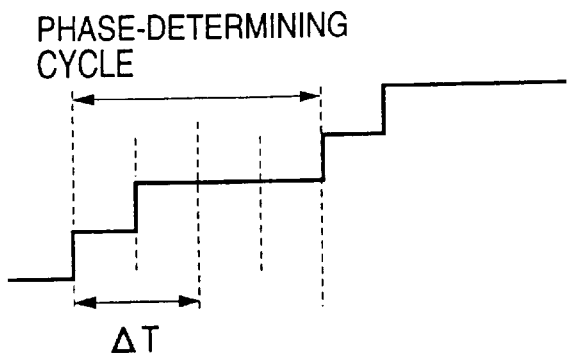
Figure 19B:
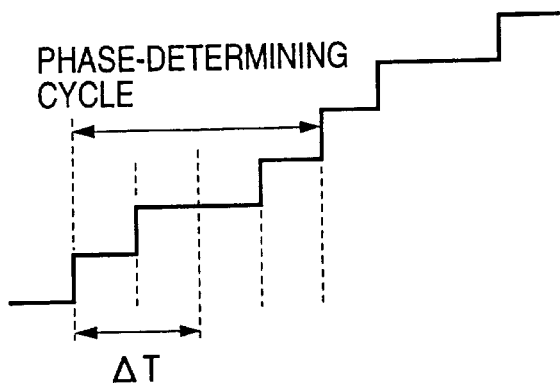
Figure 19C:
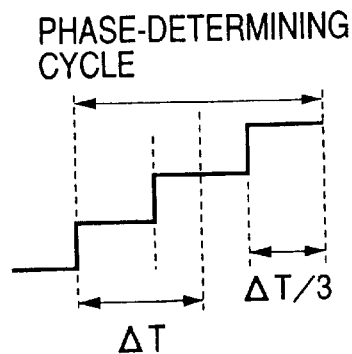

FIGS. 5(a) and 5(b) show a model representing a balance of the slip speed Vs and brake force;

FIGS. 6(a) to 6(h) show relations between deformation of a tire spring and a slippage of a road-contact surface of tire for different damper factors of the tire;

FIGS. 7(a) to 7(h) show relations between a change in wheel speed change and a change in wheel cylinder pressure for different damper factors of tire;

FIG. 8 shows a change in wheel speed Vw and changes in pressure change $\Delta Pb$, wheel speed change $\Delta Vw$, and the wheel speed change $\Delta\Delta Vw$ when the wheel cylinder pressure Pb is changed stepwise;

FIG. 9 shows pressure-increasing patterns in ranges 1 and 2;

FIG. 10 shows pressure-holding patterns in ranges 1 and 2;

FIGS. 11(a) and 11(b) show the degree of pressure increase in a pressure-increasing pattern;

FIG. 12 is a block diagram which shows an antiskid brake system according to the invention;

FIG. 13 is a block diagram which shows the structure of an electronic control circuit of the antiskid brake system of FIG. 12;

FIG. 14 is a view for explaining an operation of a phase detector in the electronic control circuit of FIG. 13;

FIG. 15 is a flowchart of an antiskid brake control operation;

FIG. 16 is a flowchart of a program for determining a target wheel cylinder pressure in antiskid brake control;

FIG. 17 is a flowchart of a program for controlling an operation of a hydraulic servomechanism of the antiskid brake system of FIG. 12;

FIG. 18(a) shows wheel speed Vw, estimated W/C pressure Pb, transfer gain, and phase delay $\phi$;

FIG. 18(b) shows brake pressure change $\Delta Pb$ and a change in wheel speed change $\Delta\Delta Vw$;

FIG. 18(c) shows the inverses in sign of brake pressure change $\Delta Pb$ and a change in wheel speed change $\Delta\Delta Vw$ from which offsets are removed;

FIG. 19(a) is an enlarge view showing the pressure-increasing pattern of FIG. 9;

FIGS. 19(b) and 19(c) show modifications of the pressure-increasing pattern of FIG. 19(a); and FIG. 20 is a block diagram which shows a modification of the electronic control circuit of FIG. 13.

DESCRIPTION OF THE PREFERRED EMBODIMENTS

Prior to describing preferred embodiments of the invention in detail, a study made by the inventor of this application for overcoming the problems, as discussed in the introductory part of this application, will be discussed below.

First, changes in brake force, wheel speed, $\mu$-s (road-tire adhesion-slip ratio) characteristics were analyzed. When it is required to increase the brake pressure supplied to a wheel cylinder (also referred to below as W/C pressure), the typical antiskid brake system steps up the W/C pressure. Changes in brake force, wheel speed, and $\mu$-s characteristics during the increasing of the W/C pressure as measured are shown in FIGS. 2(a) to 2(c), respectively.

As can be seen from FIG. 2(b), the wheel speed drops suddenly in a range 2 in which the brake force has a peak. This is because the brake torque overcomes the adhesion force between tire and road, so that rubber blocks of a tire tread all commence to slip. In a range 1 in which the brake force does not yet reach the peak, so that the slip ratio is low, the wheel speed drops slightly.

Examples of changes in wheel speed Vw and wheel acceleration Vw' with a change in W/C pressure Pb in the ranges 1 and 2 are shown in FIG. 3.

In the range 1, the adhesion between tire and road, that is, the reaction force acting on the tire from the road changes with a change in slip ratio. Thus, when the brake torque is increased, the wheel speed Vw, as shown in FIG. 3, drops until the slip ratio is reached which produces the adhesion matching the increased brake torque. Specifically, the wheel speed Vw decreases stepwise following a change in W/C pressure Pb.

In the range 2, the tire-road adhesion has reached an upper limit thereof. The applied brake torque must, thus, be absorbed by the force of inertia which is given, as shown in the above equation (1), as a function of the wheel acceleration Vw'. Therefore, the wheel speed Vw changes regardless of the wheel cylinder pressure Pb. Only the rate of change in wheel speed Vw, that is, the wheel acceleration Vw' changes.

Specifically, the step change in W/C pressure causes the wheel speed Vw to change in the range 1 in which the slip ratio is low and the wheel acceleration Vw' to change in the range 2 in which the slip ratio is high. In other words, the phase of a change in wheel speed Vw is shifted with the first-order lag following a change in W/C pressure in the range 1, while the phase of a change in wheel acceleration Vw' is shifted with the second-order lag in the range 2.

Therefore, a change in wheel speed Vw with a step change in brake force produced by a step change in W/C pressure may be expressed in a model of FIG. 4. Specifically, the change in wheel speed Vw may be modeled using a balance of a change ΔVs in slip speed Vs caused by an increment ΔTB of the brake force TB, a spring factor Ct indicative of the stiffness of the tire, and a damper factor given by dividing a rate Ck of change in frictional force produced on a contact area of the tire with a road surface with a change in slip speed Vs by the wheel speed Vw. Note that the slip speed Vs is expressed by the sum of a speed difference Vs1 between tire tread and contact surface of the road and a speed change Vs2 due to deformation of tire rubber and given by the relation of Vs=Vs1+Vs2. The slip speed Vs is thus equivalent to a difference between the vehicle speed VB and the wheel speed Vw, so that the phase of a change in slip speed Vs coincides with the phase of a change in wheel speed Vw. The balance model in FIG. 4 is defined using parameters of the slip speed Vs and the slip speed change ΔVs, however, the x-axis indicative of the slip speed Vs may alternatively be a function of the slip ratio.

What is illustrated on the right side in each of the ranges 1 and 2 in FIG. 4 is a graph which represents the relation between the slip speed Vs and the brake torque TB. A curve in the graph indicates the slips speed change ΔVs as a function of a step change ΔTB in brake torque TB. The spring factor Ct is, as clearly shown in equation (2) below, a function of the sum of a coefficient Ccx related to deformation of tread blocks of tire resulting from the drag by the road surface, a coefficient Cb related to distortion of the tire sidewalls causing an axis thereof to be shifted to a travel direction, and distortion and deformation of various parts of tire due to distortion of the tire side walls in rotational direction thereof as expressed by a coefficient Cb θ. The value derived by multiplying each term on the right side of the equation (2) by the road-tire frictional force, thus, indicates a slip distance of the tire.

$$1/Ct = 1/Ccx + 1/Cb + 1/Cb\theta \tag{2}$$

When the brake torque TB begins to increase, as shown in the range 1, the dumper factor hardly changes (Ck≈∞). Thus, assuming that the effects of the force of inertia of the tire is ignored, the slip speed ΔV changes stepwise by an amount, as specified by the relation of ΔVs=ΔTB/C, in synchronism with the brake torque change ΔTB (see the left curve as illustrated below the graph in the range 1 of FIG. 4). Specifically, in the model of FIG. 4, the wheel speed Vw is shifted in phase by the first-order lag following a change in wheel cylinder pressure.

After the brake force is increased sufficiently, as shown in the range 2, a change in the damper factor becomes great, absorbing an increase in tire spring completely, so that only the force of inertial acts on the wheel. If, therefore, the force of inertia of the wheel is defined as J, we obtain J·ΔVs'=ΔTB. The slip speed change ΔVs drops at a constant rate (see a curve as illustrated below the graph in the range 2 of FIG. 4). Specifically, in the model of FIG. 4, the wheel speed Vw is shifted in phase by the second-order lag following a change in wheel cylinder pressure.

In a transitional period of time from the range 1 to the range 2, the factor of the shift in phase of the wheel speed Vw when the brake force TB is increased stepwise changes from the first-order lag to the second-order lag gradually.

FIGS. 5(*a*) and 5(*b*) show a model representing a balance of the slip speed Vs and brake force.

Variations in slip speed Vs in the ranges 1 and 2 will be discussed below in detail with reference to FIGS. 5(*a*) and 5(*b*). In the drawings, TB denotes the brake force (or brake torque). J denotes the moment of inertia of tire. Ct denotes a total value of various spring elements of tire (i.e., the stiffness). Vs denotes the slip speed. Vs1 denotes a component of the slip speed Vs as expressed as the amount of extension of the spring elements of tire. Vs2 denotes a component of the slip speed Vs corresponding to the amount of slippage of a road-contact surface of tire, that is, as expressed as a shift in damper factor.

From the shown model, we obtain the following balance equations.

$$J \cdot Vw' = TB - Ct \cdot Vs1 \tag{3}$$

$$Ct \cdot Vs1 = C/Vw \cdot Vs2 \tag{4}$$

$$Vs = Vs1 + Vs2 \ (=Vw-B) \tag{5}$$

Specifically, the equation (3) represents a force balance in a rotational direction of the tire. The equation (4) represents a force balance of the spring elements of the tire and a road-contact surface of the tire. The equation (5) indicates that the slip speed is equivalent to the sum of the amount of extension of the spring elements and the amount of slippage of the road-contact surface of the tire.

Assuming that the brake torque TB is increased by ΔTB, the change ΔVs in slip speed Vs may be expressed using the above equations as follows:

$$\Delta VS = \frac{\frac{Ck}{Vw} \cdot S + Kt}{J \cdot \frac{Ck}{Vw} \cdot S^2 + \left(Ct \cdot \frac{Ck}{Vw} + J \cdot Ct\right) \cdot S} \cdot \Delta TB \tag{6}$$

Note that the equation (6) is derived under condition that a change in vehicle speed VB is much smaller than the slip speed change ΔVs so that it may be ignored.

From the equations (3) to (5), a change ΔVs1 in component of the slip speed Vs as expressed as the amount of extension of the spring elements of the tire and a change ΔVs2 in component of the slip speed Vs as expressed as a shift in damper factor may be given as $$\Delta Vs1 = \frac{1}{J \cdot S + Ct\left(1 + \frac{J}{\frac{Ck}{Vw}}\right)} \cdot \Delta TB \tag{7}$$

-continued $$S \cdot \Delta V_{s2} = \cfrac{1}{\left(\cfrac{Ck}{Vw} \cdot \cfrac{J}{Ct}\right) \cdot S + \left(J + \cfrac{Ck}{Vw}\right)} \cdot \Delta TB \qquad (8)$$

From the above equations, it is found that the change $\Delta Vs1$ is shifted in phase by the first-order lag from the change $\Delta TB$ in brake torque TB, and the change $\Delta Vs2$ is shifted in phase by the second-order lag from the change $\Delta TB$ in brake torque TB.

Specifically, in the range 1 where the damper factor hardly changes, the slip speed Vs may be indicated as a function the component Vs1 as expressed as the amount of extension of the spring elements of the tire, and the change $\Delta Vs1$ thereof is shifted in phase by the first-order lag. In the range 2 where the damper factor changes greatly, the slip speed Vs may be indicated as a function the component Vs2 as expressed as the amount of shift in damper factor, and the change $\Delta Vs2$ thereof is shifted in phase by the second-order lag.

Therefore, it is followed that the change in wheel speed Vw which is substantially identical in phase with the slip speed Vs is shifted in phase similar to the slip speed Vs.

For reference, results of simulations in terms of the speed change $\Delta Vs1$ resulting from the deformation of the tire spring when a slippage factor of the road-contact surface of the tire (i.e., the damper factor C) is decreased for a fixed spring constant of the tire and the slip speed change $\Delta Vs$ that is the sum of the speed change $\Delta Vs1$ and the amount of slippage of the road-contact surface of the tire $\Delta Vs2$ are shown in FIGS. 6(a) to 6(h). Results of simulations in terms of the slip speed change $\Delta Vs$ when the wheel cylinder pressure Pb is changed stepwise are also shown in FIGS. 7(a) to 7(h).

From the shown results, it is found that when the slippage factor C is higher, only the tire spring is extended, changing the slip speed change $\Delta Vs$, and as the slippage factor C is decreased, the change in extension of the tire spring is decreased, while the amount of slippage of the road-contact surface of the tire is increased.

Accordingly, the inventor of this application paid attention to the phase delay of the slip speed change $\Delta Vs$ caused by the brake torque change $\Delta TB$ and found a method of detecting a drop in wheel speed Vw based on the phase delay of the slip speed change $\Delta Vs$ to determine the timing where the brake pressure is decreased in the antiskid brake control.

FIG. 8 shows a change in wheel speed Vw and resultant changes in W/C pressure (referred to below as brake pressure change $\Delta Pb$, wheel speed Vw (referred to below as wheel speed change $\Delta Vw$, and wheel speed change $\Delta Vw$ (referred to below as change in wheel speed change $\Delta\Delta Vw$, as determined in a given period of time $\Delta T$. A method of determining these parameters will be described below in detail.

Comparison between the ranges 1 and 2 shows that the waveforms of the wheel speed Vw, the wheel speed change $\Delta Vw$, and the change in wheel speed change $\Delta\Delta Vw$ change, and phases thereof are delayed.

The detection of drop in wheel speed Vw may, thus, be accomplished using the fact that in a transitional period of time from the range 1 to the range 2, the wheel speed Vw, the wheel speed change $\Delta Vw$, and the change in wheel speed change $\Delta\Delta Vw$ are shifted in phase thereof. For instance, when the phase delay of the wheel speed Vw, that is, a shift in phase of the wheel speed Vw from the W/C pressure Pb exceeds a given threshold value, it may be determined that the wheel speed Vw has dropped.

It is difficult to compare the phase of the wheel cylinder pressure Pb with the wheel speed Vw because null levels thereof are different from each other. The comparison may, however, be achieved by bringing null levels of the brake pressure change $\Delta Pb$ and the wheel speed change $\Delta Vw$ into agreement with each other. Therefore, the comparison between the phases of the brake pressure change $\Delta Pb$ and the wheel speed change $\Delta Vw$ enables the drop in wheel speed Vw to be detected based on the phase delay of the wheel speed change $\Delta Vw$.

The wheel speed change $\Delta Vw$ contains an offset equivalent to the rate of decrease in vehicle speed (i.e., the deceleration of the vehicle body), and, thus, the wheel speed change $\Delta Vw$ is not expressed on the basis of the null level accurately. For this reason, use of the change in wheel speed change $\Delta Vw$ allows the offset to be removed from the wheel speed change $\Delta Vw$, thereby allowing the drop in wheel speed Vw to be determined accurately based on the phase delay of the change in wheel speed change $\Delta\Delta Vw$ derived by comparing the phase of the brake pressure change $\Delta Pb$ with that of the change $\Delta\Delta Vw$.

Next, the inventor of this application studied the determination of the degree of drop in wheel speed Vw by comparison between the phase of the brake pressure change $\Delta Pb$ and the phase of the wheel speed change $\Delta Vw$ or the change in wheel speed change $\Delta\Delta Vw$ based on the above described analysis.

The phase delay of the wheel speed Vw is, as described above, determined based on a step change in W/C pressure Pb. Thus, the antiskid brake system measures, in practice, the phase delay of the wheel speed Vw when the W/C pressure Pb is increased, detects the drop in wheel speed Vw based on the phase delay, and stops increasing the W/C pressure Pb and holds it before the degree of drop in wheel speed Vw becomes great, that is, before entering the range 2, thereby producing the brake force whose level produces a value of the tire-road adhesion $\mu$ in the vicinity of the peak thereof. This brake force will be referred to below as $\mu$-peak brake force.

However, the road condition may be changed during traveling of the vehicle. It is, thus, necessary to modify the W/C pressure Pb quickly as a function of the change in road condition. For instance, it is required to increase the W/C pressure Pb greatly upon change in road condition. It is, thus, essential that a change in drop in wheel speed Vw resulting from the change in road condition be monitored during a time when the W/C pressure Pb is held constant. It is, thus, advisable that a brake pressure-increasing pattern and a brake pressure-holding pattern used in the antiskid brake control be so determined that the change in wheel speed Vw may be measured.

Accordingly, the inventor of this application found, as an example, a brake pressure-increasing pattern and a brake pressure-holding pattern, as shown in FIGS. 9 and 10, suitable for the antiskid brake control.

If a time ($\Delta T/2$) that is half the change-determining cycle $\Delta T$ is defined as the width of a pulse of brake pressure (i.e., a unit change in W/C pressure), the W/C pressure Pb in the brake pressure-increasing pattern of FIG. 9 is, in sequence, increased, increased, held, and held during one control cycle equivalent to four times the pulse width. In the brake pressure-holding pattern of FIG. 10, the W/C pressure Pb is, in sequence, increased, decreased, held, and held during one control cycle equivalent to four times the pulse width. Specifically, a pulsed increase in W/C pressure Pb is produced for measuring the degree of drop in wheel speed Vw, after which the W/C pressure Pb is held at an initial level.

As can be seen from FIGS. 9 and 10, the brake pressure change $\Delta Pb$, the wheel speed change $\Delta Vw$, and the change in wheel speed change ΔΔVw in the brake pressure-increasing pattern show waveforms similar to those in the brake pressure-holding pattern. This allows the brake pressure change ΔPb and the wheel speed change ΔVw or the change in wheel speed change ΔΔVw to be compared in sequence in the brake pressure-increasing pattern and the brake pressure-holding pattern.

Specifically, the use of the brake pressure-increasing and -holding patterns allows the brake pressure change ΔPb and the wheel speed change ΔVw or the change in wheel speed change ΔΔVw to be compared even when the W/C pressure Pb is regulated sequentially according to the brake pressure-increasing pattern and the brake pressure-holding pattern, thus enabling a change in wheel speed Vw to be determined even after start of regulation of the W/C pressure Pb according the brake pressure-holding pattern.

The use of a filter designed to calculate each of the brake pressure change ΔPb and the wheel speed change ΔVw or the change in wheel speed change ΔΔVw by finding a difference between instant values sampled at a given time interval minimizes a delay in determining the phases thereof. The pressure-increasing and -holding patterns of FIGS. 9 and 10, are so made that the same change in W/C pressure Pb is repeated in synchronism with the control cycle, thereby eliminating a variation in calculating the phases between the control cycles.

When it is required to increase the W/C pressure quickly, the amplitude of a rise in W/C pressure may be, as shown in FIG. 11(a), increased from the first control cycle to the second control cycle. For instance, if a change in road surface condition is detected in the pressure-holding mode, as shown in FIG. 11(b), by monitoring the phase delay φ of a change in wheel speed Vw, the need may arise for increasing W/C pressure rapidly upon the change in road surface condition. In this case, it is preferable to change the degree of a rise in W/C pressure like the one shown in FIG. 11(a).

FIG. 12 shows an antiskid brake system for automotive vehicles according to the first embodiment of the invention.

The antiskid brake system has wheel speed sensors 5, 6, 7, and 8 installed near front right, front left, rear right, and rear left wheels 1, 2, 3, and 4, respectively. Each of the wheel speed sensors 5 to 8 is made of an electromagnetic or an magnetoresistance sensors and designed to output a pulse signal whose frequency is a function of the number of rotations of a corresponding one of the wheels 1 to 4 per unit time. The antiskid brake system also includes hydraulic wheel cylinders (i.e., brakes) 11, 12, 13, and 14 to which the hydraulic pressure is supplied from a master cylinder 16 through actuators 21, 22, 23, and 24 such as control valves to apply the brake pressure to the wheels 1 to 4, respectively.

The antiskid brake system also includes a stop switch 26 and an electronic control circuit 40. The stop switch 26 is responsive to the depression of a brake pedal 25 initiating a braking operation to output an ON-signal indicative thereof to the electronic control circuit 40. When the brake pedal 25 is released, the stop switch 26 outputs an OFF-signal to the electronic control circuit 40.

The actuators 21 to 24 are electronically controlled by the electronic control circuit 40 to regulate the pressure of brake fluid in the wheel cylinders 11 to 14 under the antiskid brake control. Each of the actuators 21 to 24 includes a three-position solenoid valve designed to assume a pressure rise enable valve position A, a pressure-holding valve position B, and a pressure-reducing valve position C. The pressure rise enable valve position A is established when each of the actuators 21 to 24 is deenergized to communicate the master cylinder 16 with one of the wheel cylinders 11 to 14, allowing the brake fluid pressure supplied to the wheel cylinder (also referred to below as W/C pressure) to be increased as a function of the pressure developed in the master cylinder 16. The pressure-holding and pressure-reducing valve positions B and C are established selectively as a function of the level of current supplied to each of the actuators 21 to 24. In the pressure-holding valve position B, the fluid communication between the master cylinder 16 and each of the wheel cylinders 11 to 14 is blocked to hold the W/C pressure as is. In the pressure-reducing valve position C, the brake fluid within each of the wheel cylinders 11 to 14 is drained into one of reservoirs 28a and 28b to reduce the W/C pressure. When the brake fluid within the reservoirs 28a and 28b is filled up, each of motor-driven pumps 27a and 27b pumps the brake fluid out of one of the reservoirs 28a and 28b into the master cylinder 16.

The electronic control circuit 40 is implemented by a microcomputer consisting of a CPU, a ROM, a RAM, and an input/output interface and is activated upon turning on of an ignition switch 41 to control the actuators 21 to 24 based on signals from the wheel speed sensors 5 to 8 and the stop switch 26 according to an antiskid brake control program, as will be described later in detail.

The electronic control circuit 40 has a control block, as shown in FIG. 13, which consists of a peak search circuit 50, a recovery circuit 60, and a hydraulic servomechanism 70. The peak search circuit 50 and the recovery circuit 60 are actuated selectively by a switch 71 as a function of a condition of the vehicle so that a control signal produced by either of the peak search circuit 50 and the recovery circuit 60 is inputted to the hydraulic servomechanism 70. The hydraulic servomechanism 70 determines a pressure-increasing time in which the actuators 21 to 24 are actuated in a pressure-increasing mode, a pressure-holding time in which the actuators 21 to 24 are actuated in a pressure-holding mode, and a pressure-reducing time in which the actuators 21 to 24 are actuated in a pressure-reducing mode and also determines the W/C pressure Pb based on these times to control drivers of the actuators 21 to 24. As will be described later in detail, the switch 71 usually establishes a connection between the peak search circuit 50 and the hydraulic servomechanism 70 and switches it to a connection between the recovery circuit 60 and the hydraulic servomechanism 70 when a drop in wheel speed Vw becomes great.

The peak search circuit 50 serves to control the W/C pressure according to the pressure-increasing and pressure-holding patterns, as shown in FIGS. 9 and 10, so as to apply the brake force to each of the wheels 1 to 4 which provides the value of the tire-road adhesion μ near the peak thereof. The peak search circuit 50 includes a hydraulic pressure change determining circuit 51, a wheel speed change determining circuit 52, a phase detector 53, and a pressure-increasing/-holding pattern selecting circuit 54. The hydraulic pressure change determining circuit 51, as described later in detail, samples the W/C pressure Pb derived by the hydraulic servomechanism 70 cyclically and determines, in sequence, a difference between an instant value sampled currently and an instant value sampled a given period of time earlier (i.e., the change-determining time interval ΔT). This difference, as already discussed in FIGS. 8, 9, and 10, will be referred to below as brake pressure change ΔPb. The wheel speed change determining circuit 52 samples the signal outputted from each of the wheel speed sensors 5 to 8 cyclically to determine a difference between instant values of the wheel speed Vw of each of wheels 1 to 4 in the same manner as the hydraulic pressure change determining circuit 51. This difference will be referred to below as wheel speed change ΔVw. The phase detector 53, as will be described later in detail, determines a phase difference between the brake pressure change ΔPb and the wheel speed change ΔVw. The pressure-increasing/-holding pattern selecting circuit 54 selects the pressure-increasing patter or the pressure-reducing pattern based on the phase difference derived by the phase detector 53. Upon selection of the pressure-increasing or pressure-holding pattern, the pressure-increasing/-holding pattern selecting circuit 54 compares the pattern with the W/C pressure Pb and provides a hydraulic control signal PN to the hydraulic servomechanism 70 through the switch 71 to have the W/C pressure Pb follow the selected one of the pressure-increasing and pressure-holding patterns under feedback control.

The recovery circuit 60 works to recover or compensate for a drop in wheel speed Vw of each of the wheels 1 to 4 resulting from an undesirable elevation in W/C pressure causing the tire-road adhesion $\mu$ to exceed the peak which usually occurs when the vehicle has moved to a low friction road from a high friction road or when the vehicle is traveling on a road having different tire-road adhesions $\mu$. The recovery circuit 60 includes a maximum frictional force equivalent pressure estimating circuit 61 and a speed drop determining circuit 62. The maximum frictional force equivalent pressure estimating circuit 61 estimates the brake pressure PM required to produce a maximum frictional force between road and tire that brings the road-tire adhesion $\mu$ to the peak thereof. The speed drop determining circuit 62 determines the amount of drop in wheel speed Vw (will also be referred to as wheel speed drop WP) based on a change in wheel speed Vw. The recovery circuit 60 produces the hydraulic control signal PN based on the brake pressure PM and the wheel speed drop WP. When the wheel speed drop WP exceeds a given threshold value, the speed drop determining circuit 62 operates the switch 71 to establish the connection between the recovery circuit 60 and the hydraulic servomechanism 70 to output the hydraulic control signal PN to the hydraulic servomechanism 70.

FIG. 14 shows a logical structure of the phase detector 53.

The phase detector 53 detects the phases of the brake pressure change ΔPb and the wheel speed change ΔVw or the change in wheel speed change ΔΔVw and determines a difference in phase between the brake pressure change ΔPb and the wheel speed change ΔVw or between the brake pressure change ΔPb and the change in wheel speed change ΔΔVw. The change in wheel speed change ΔΔVw is, as already described, determined by sampling the wheel speed change ΔVw cyclically and determines, in sequence, a difference between an instant value sampled currently and an instant value sampled a given period of time earlier (i.e., the change-determining time interval ΔT).

As will be described later in detail, in order to remove offsets or noises contained in values of the brake pressure change ΔPb and the wheel speed change ΔVw or the change in wheel speed change ΔΔVw, the system of this embodiment subtracts a mean value Mean(ΔPb) of a given number of successive values of the brake pressure change ΔPb, a mean value Mean(ΔVw) of a given number of successive values of the wheel speed change ΔVw, and a mean value Mean(ΔΔVw) of a given number of successive values of the change in wheel speed change ΔΔVw from the brake pressure change ΔPb, the wheel speed change ΔVw, and the change in wheel speed change ΔΔVw, respectively, and outputs resultant values to the phase detector 53.

For assuring the accuracy in determining the phase difference in the phase detector 53, the change-determining time interval ΔT that is a time interval between sampled values used to determine the brake pressure change ΔPb in the hydraulic pressure change determining circuit 51 is set to coincide, in time sequence, with that used in the wheel speed change determining circuit 52. The pulse width ΔT/2 that is, as described above, the width of a step change in W/C pressure and one control cycle of each of the pressure-increasing and pressure-holding patterns are fixed. In this embodiment, ΔT=0.1 sec. The pulse width ΔT/2=0.05 sec. One control cycle of each of the pressure-increasing and pressure-holding patterns=0.2 sec. The mean values Mean(ΔPb), Mean(ΔVw), and Mean(ΔΔVw) are determined cyclically at a time interval T of 0.2 sec.

The phase detector 53 determines the phase difference according to equations below.

$$y(t)=-ay(t-1)+bu(t-1)+e(t) \quad (9)$$

where a and b are constants, and e(t) represents an error component.

$$\theta = \begin{pmatrix} a \\ b \end{pmatrix} \quad (10)$$

$$\phi(t) = \begin{bmatrix} -y(t-1) \\ u(t-1) \end{bmatrix} \quad (11)$$

$$\bar{\theta} = \left(\frac{1}{N}\sum_{t=1}^{N}\phi(t)\phi^{T(t)}\right)^{-1}\frac{1}{N}\sum_{t=1}^{N}\phi(t)y(t) \quad (12)$$

Note that Eq. (9) represents a first-order lag model, Eq. (10) represents model parameters, Eq. (11) represents a regression vector, and Eq. (12) is a model parameter-projecting equation for projecting the parameters in the model using the method of least squares.

From the parameter derived by the equation (12), the phase delay is determined. Eq. (13), as shown below, represents a transfer function in fo (frequency). Eq. (14) is an equation for a gain in fo. Eq. (15) is an equation for finding a phase delay in fo.

$$G = \frac{bZ_0^{-1}}{1+aZ_0^{-1}} \quad (13)$$

where $$Z_0 = e^{j\,2\,\pi fo Ts} \mathrm{mag}=|G| \quad (14)$$

$$\mathrm{Phase} = a\tan\left(\frac{\mathrm{im}(G)}{\mathrm{re}(G)}\right) \quad (15)$$

If an input/output time interval for the parameter projection is increased further, we have $$y(t)=-ay(t-m)+bu(t-m)+et \quad (16)$$

$$\phi(t) = \begin{bmatrix} -y(t-1) \\ u(t-1) \end{bmatrix} \quad (17)$$

Note that Eq. (16) represents a modification of the first-order lag model in Eq. 9, and Eq. (17) represents a regression vector in the modified model in Eq. (16). By substituting Eq. (17) into Eq. (12), a parameter is, similar to Eq. (12), obtained using the method of least squares.

A case is referred to here which utilizes the identification of a model based on the parameter derived in the method of least squares, however, the methods of correlation, successive least squares, and successive correlation may alternatively be used. For reference, equations using the method of correlation are shown below.

$$\phi(t) = \begin{bmatrix} -y(t-1) \\ u(t-1) \end{bmatrix} \quad (18)$$

$$\xi(t) = \begin{bmatrix} -u(t-2) \\ u(t-1) \end{bmatrix} \quad (19)$$

$$\overline{\theta} = \left( \frac{1}{N} \sum_{i=1}^{N} \varsigma(t) \phi^T(t) \right)^{-1} \frac{1}{N} \sum_{i=1}^{N} \varsigma(t) y(t) \quad (20)$$

Note that Eq. (18) represents a regression vector, Eq. (19) represents a correlation vector, and Eq. (20) is a model parameter-projecting equation.

As shown in FIG. 14, $\Delta Pb - Mean(\Delta Pb)$ and $-(\Delta\Delta Vw - Mean(\Delta\Delta Vw))$ or $-(\Delta Vw - Mean(\Delta Vw))$ are inputted as u(t) and y(t) directly into the phase detector 53, however, a signal indicative of y(t) may be passed through a low-pass filer before inputted into the phase detector 53 for eliminating frequency noises occurring in the suspension system of the vehicle. For example, 40 Hz may be removed from the signal indicative of y(t).

It is also advisable that gains of u(t) and y(t) in the phase detector 53 be kept constant for eliminating adverse effects on calculation of the phase delay φ which is caused by a difference between the gains. This may be achieved by dividing u(t) and y(t) by gains uk and uk (i.e., u(t)=u(t)/uk, y(t)=y(t)/yk) where uk=k·u(t)+(1−k)·uk, yk=k·y(t)+(1−k)yk, and kis a constant, e.g., 0.2).

The antiskid brake control performed by the electronic control circuit 40 will be described below.

FIG. 15 shows a program or sequence of logical steps in a whole operation of the antiskid brake control. The program is executed by time interrupt in the CPU at a regular interval of, for example, 8 msec. in synchronism with wheel speed-sampling cycles.

After entering the program, the routine proceeds to step 100 wherein the vehicle speed VB (i.e., the speed of the vehicle body) is projected. In this embodiment, the greatest of the speeds of the wheels 1 to 4 is defined as the vehicle speed VB. Specifically, the greatest of the wheel speeds Vw** of the wheels 1 to 4 derived in step 300 in a previous program cycle is selected. Next, it is determined whether or not the greatest wheel speed lies within an allowable range of a given upper limit to a given lower limit. The upper limit is defined by the sum of an increment of the vehicle speed by a maximum actual acceleration of the vehicle and the vehicle speed VB projected one program cycle earlier. The lower limit is defined by the sum of a decrement of the vehicle speed by a maximum actual deceleration of the vehicle and the vehicle speed VB projected one program cycle earlier. If the greatest wheel speed lies within the allowable range, it is determined as the vehicle speed VB. Alternatively, if not, one of the upper and lower limits closer to the greatest wheel speed is determined as the vehicle speed VB.

The routine proceeds to step 200 wherein it is determined whether the antiskid brake control should be initiated or not. When the ON-signal is inputted from the brake switch 26, and any of the four wheels 1 to 4 exceeds a given deceleration value, it is determined that the antiskid brake control should be started. For instance, when either of the front wheels 1 and 2 exceeds in deceleration 0.8 G or when either of the rear wheels 3 and 4 exceeds in deceleration 0.6 G, the antiskid brake control is determined to be started.

The peak of the road-tire adhesion μ depends upon road surface conditions and the vehicle speed. Thus, in this discussion, it is assumed that the vehicle is traveling on an asphalt road. The antiskid brake control system selects a criterion for determining the initiation of the antiskid brake control from a map as a function of the vehicle speed.

If a YES answer is obtained in step 200, then the routine proceeds to step 300 wherein the W/C pressure in each of the wheel cylinders 11 to 14 of the wheels 1 to 4 is adjusted under the antiskid brake control based on the speed of a corresponding one of the wheels 1 to 4 determined as a function of the pulse signal outputted from a corresponding one of the wheel speed sensors 5 to 8.

FIG. 16 shows an operation of the antiskid brake system performed in step 300 of FIG. 15 for each wheel.

First, in step 101, the phase detector 53 determines a difference in phase between the brake pressure change $\Delta Pb$ and the wheel speed change $\Delta Vw$ or between the brake pressure change $\Delta Pb$ and the change in wheel speed change $\Delta\Delta Vw$ to find a phase delay φ** of the wheel speed change $\Delta Vw$ or the change in wheel speed change $\Delta\Delta Vw$ from the brake pressure change $\Delta Pb$ in each of the wheels 1 to 4.

The routine proceeds to step 102 wherein a W-parameter WP is determined based on the wheel speed Vw and the vehicle speed VB which is employed in an operation, as will be described later in detail, when the wheel speed Vw decreases below a value producing the maximum road-tire frictional force. The W-parameter WP is a feedback control factor which is used in a conventional antiskid brake system to minimize an undesirable acceleration produced when the road-tire adhesion μ exceeds the peak thereof and given by the following equation.

$$WP^{} = K1(\Delta Vw^{} - \Delta VB) + K2 (Vw^{} - VB) + K3\Sigma(Vw^{} - VB) \quad (21)$$

where K1, K2, and K3 are weighting coefficients for a differential term, a stationary term, and an integral term of Eq. (20), and $\Delta Vw^{**}$ and $\Delta VB$ are defined, as expressed blow, as changes for a cycle of 0.1 sec.

$$\Delta Vw^{**} = Vw(n) - Vw(n-N) \quad (22)$$

$$\Delta VB = VB(n) = VB(n-N) \quad (23)$$

where N=0.1/Ts, and Ts is a sampling cycle.

The routine proceeds to step 103 wherein it is determined whether an absolute value of the W-parameter WP is greater than a threshold value Krec or not, thereby deciding whether a recovery operation should be initiated or not. If the brake force has exceeded the μ-peak brake force or a undesirable external force has acted on the tire because of passage of the vehicle on a step of the road, for example, a YES answer is obtained, and the routine proceeds to step 104 to perform the recovery operation, thereby bringing the slip ratio to a suitable one after a sudden drop in wheel speed Vw. Alternatively, if a NO answer is obtained, then the routine proceeds to step 106 to perform a peak search operation.

In step 104, the brake pressure PM** required to produce the maximum road-tire frictional force is determined in the following manner. The wheel acceleration Vw' and the W/C pressure Pb (i.e., the brake pressure) has, as described in the introductory part of this application, a relationship below.

$$I/rVw^{\prime} = F\text{max} - K\text{pad} \cdot Pb^{} \quad (24)$$

Eq. (24) may be replaced with a relation, as expressed by equation (25) below, between a vehicle body deceleration VB' and the brake pressure PM** matching the maximum road-tire frictional force Fmax.

$$I/rVB'=F\mathrm{max}-K\mathrm{pad}\cdot Pb** \tag{25}$$

From Eqs. (24) and (25), we obtain $$PM=I/r/K\mathrm{pad}(Vw'-VB')+Pb** \tag{26}$$

However, since the determination of Vw' and VB' requires a differential operation, which will result in an increase in noise, equation (27) below is, in practice, employed which is derived by integrating and averaging Eq. (26) for a given period of time. Upon finding PM and VB', Fmax may be determined. In other words, Eq. (26) serves as an observer of the maximum road-tire frictional force.

$$PM = \frac{1}{N^2}\left\{I/r/Kpad\sum_{N2}(\Delta Vw-\Delta VB) + \sum_{N2} PB**(u)\right\} \tag{27}$$

where $\Delta Vw**$ and $\Delta VB$ are defined, as expressed blow, by changes for a cycle of 0.1 sec.

$$\Delta Vw**=Vw(n)-Vw(n-N2) \tag{28}$$

$$\Delta VB=VB(n)=VB(n-N2) \tag{29}$$

In Eqs (24) to (29), I is the moment of inertia of each wheel, r is the radius of tire, Fmax is a maximum road-tire frictional force, Kpad is a brake pad constant, Pb** is a current W/C pressure, N2 is the number of samples for 0.1 sec. (=0.1/Ts).

The routine proceeds to step 105 wherein the brake pressure PM derived in step 104 is added to the product of the W-parameter WP derived in step 101 and a given gain Kwp to determine a target brake pressure PN to be developed in one of the wheel cylinders 11 to 14**.

If a NO answer is obtained in step 103, then the antiskid brake control, as described above, enters the peak search mode to select one of the pressure-increasing and pressure-holding patterns as a function of the phase delay φ derived in step 101. First, in step 106, it is determined whether the phase delays φ is greater than a given threshold value φth or not. If a NO answer is obtained meaning that the wheel speed lies within the range 1, as shown in FIG. 2(*b*), then the routine proceeds to step 107 to select a pressure-increasing pattern such as the one shown in FIG. 9. Alternatively, if a YES answer is obtained meaning that the brake force is already in the vicinity of the μ-peak brake force, then the routine proceeds to step 108 to select a pressure-holding pattern such as the one shown in FIG. 10.

In the pressure-increasing pattern, as shown in FIG. 9, the first increment of the brake pressure Pb has a smaller step width, and a subsequent increment has a greater step width for responding to a change in road surface condition quickly. If the pressure-holding pattern is selected, a pressure-holding operation initiating signal is changed depending upon whether a control signal outputted to a corresponding one of the actuators 21 to 24 immediately before the pressure-holding mode is entered is a pressure-increasing signal or a pressure-reducing signal. Specifically, if the pressure-increasing signal is outputted immediately before the pressure-holding mode is entered, the control signal is provided which decreases the brake pressure or W/C pressure first. Alternatively, if the pressure-reducing signal is outputted immediately before the pressure-holding mode is entered, the control signal is provided which increases the W/C pressure first.

Specifically, when the pressure-increasing mode is entered, the recovery circuit 60 determines a hydraulic increment/decrement ΔPN which increments the W/C pressure by 0.5 Mpa 0.05 sec. after the initiation of the pressure-increasing mode and further increments the W/C pressure by 0.5 Mpa 0.1 sec. after the initiation of the pressure-increasing mode. Alternatively, when the pressure-holding mode is entered, the recovery circuit 60 produces the hydraulic increment/decrement ΔPN which increments the W/C pressure by 0.05 Mpa 0.05 sec. after the initiation of the pressure-increasing mode and decrements the W/C pressure by 0.05 Mpa 0.1 sec. after the initiation of the pressure-increasing mode.

If the value of the hydraulic increment/decrement ΔPN is too small, it will cause the pressure-increasing signal (referred to below as TUP) or the pressure-reducing signal (referred to below as TDW) outputted to the solenoid of a corresponding one of the actuators 21 to 24 to be too small to energize the solenoid. Even if it is possible to energize the solenoid, a change in W/C pressure is insufficient for changing the wheel speed to enable the phase delay to be determined. Therefore, the recovery circuit 60 determines the hydraulic increment/decrement ΔPN so that the pulse width or output duration of each of the pressure-increasing and pressure-reducing signals TUP and TDW may be equivalent to 3 msec. or more. Specifically, if a change in W/C pressure calculated in a case where the pulse width of the pressure-increasing signal TUP is set to 3 msec. is defined as ΔPN3, it may be expressed as $$\Delta PN3 = KUP\cdot TUP \tag{30}$$

In a case where it is possible to measure the pressure Pmc in the master cylinder 16 directly through a pressure sensor, ΔPN3 may be expressed as $$\Delta PN3 = (Pmc-Pb)EXP(-KUP\cdot TUP) \tag{31}$$

Similarly, ΔPN3 calculated in a case where the pulse width of the pressure-reducing signal TDW is set to 3 msec. may be expressed as $$\Delta PN3 = Pb(1-EXP(-KDW\cdot TDW**)) \tag{32}$$

If the value of ΔPN3 is smaller than a desired pressure change of 0.5 MPa, then the hydraulic increment/decrement ΔPN is set equal to ΔPN3. Alternatively, if the value of ΔPN3 is greater then 0.5 MPa, it means that it is possible to provide a pulse having a width (i.e., the output duration of the pressure-reducing signal TDW) sufficient for energizing the solenoids of the actuators 21 to 24**, and thus, the hydraulic increment/decrement ΔPN is set to 0.5 MPa.

After the hydraulic increment/decrement ΔPN is determined in the above manner, the routine proceeds to step 109 wherein the hydraulic increment/decrement ΔPN is added to the W/C pressure Pb to determine the target brake pressure PN** (i.e., a target W/C pressure).

After step 105 or 109, the routine proceeds to step 110 wherein the hydraulic servomechanism 70 determines the pressure-increasing signal TUP or the pressure-reducing signal TDW which brings the W/C pressure into agreement with the target brake pressure PN**.

FIG. 17 shows an operation performed in step 110 of FIG. 16 by the hydraulic servomechanism 70.

First, in step 401, it is determined whether the target brake pressure PN is greater than the W/C pressure Pb developed one program cycle earlier, that is, an estimated current level of the W/C pressure Pb or not. If a YES answer is obtained (PN>Pb**), then the routine proceeds to step 402 to initiate the pressure-increasing mode. Alternatively, if a NO answer is obtained, then the routine proceeds to step 412 to initiate the pressure-reducing mode.

In step 402, it is determined whether the target brake pressure PN is greater than a maximum pressure KPMAX (e.g., 30 MPa) or not. If a NO answer is obtained (KPMAX>PN), then the routine proceeds to step 405 wherein the maximum pressure KPMAX is defined as pressure PMAX. The routine proceeds to step 408 wherein an output duration of the pressure-increasing signal TUP is set to be equal to the sampling cycle Ts for increasing the W/C pressure at a full rate, and the W/C pressure Pb is set to the pressure PMAX.

Alternatively, if a YES answer is obtained in step 402, then the routine proceeds to step 403 wherein the sum of KUP that is an increment of the W/C pressure when the pressure-increasing signal TUP is outputted for the sampling cycle Ts and a current level of the W/C pressure Pb is defined as the pressure PMAX**.

The routine proceeds to step 404 wherein it is determined whether the target brake pressure PN is smaller then the pressure PMAX or not. If a NO answer is obtained (PN>PMAX), then the routine proceeds to step 408. Alternatively, if a YES answer is obtained, then the routine proceeds to step 406 wherein the output duration of the pressure-increasing signal TUP** is determined according to equation (33) below.

$$TUP^{}=(PN^{}-Pb^{**})/KUP \qquad (33)$$

The routine proceeds to step 407 wherein it is determined whether the output duration of the pressure-increasing signal TUP derived in step 406 is greater than KTUPMIN or not that is a minimum energization time of the solenoid of each of the actuators 21 to 24. If a NO answer is obtained meaning that there is the possibility of failure in operation of the solenoid resulting in an error in the antiskid brake control, the routine terminates without outputting the pressure-increasing signal TUP and updating the W/C pressure Pb. Alternatively, if a YES answer is obtained, then the routine proceeds to step 409 wherein the W/C pressure Pb is updated and set to the target brake pressure PN**.

After step 408 or 409, the routine proceeds to step 410 wherein the output duration of the pressure-increasing signal TUP derived in step 408 or 409 is set in a solenoid energization timer of the hydraulic servomechanism 70. The hydraulic servomechanism 70 outputs the pressure-increasing signal TUP to one of the actuators 21 to 24, thereby increasing the W/C pressure in a corresponding one of the wheel cylinders 11 to 14.

If a NO answer is obtained in step 401, the antiskid brake control enters the pressure-reducing mode. First, in step 412, it is determined whether the target brake pressure PN is greater than a minimum pressure KPMIX(e.g., 0.2 MPa) or not. If a NO answer is obtained (KPMIX>PN), then the routine proceeds to step 415 wherein the minimum pressure KPMIX is defined as pressure PMIX. The routine proceeds to step 418 wherein an output duration of the pressure-increasing signal TDW is set to be equal to the sampling cycle Ts for decreasing the W/C pressure at a full rate, and the W/C pressure Pb is set to the pressure PMIX.

Alternatively, if a YES answer is obtained in step 412, then the routine proceeds to step 413 wherein the value of KDW that is a decrement of the W/C pressure when the pressure-reducing signal TDW is outputted for the sampling cycle Ts is substituted into an equation below to obtain the pressure the pressure PMIX.

$$PMIN^{}=Pb^{}EXP(-KDW \cdot Ts) \qquad (34)$$

The routine proceeds to step 414 wherein it is determined whether the target brake pressure PN is smaller then the pressure PMIX or not. If a NO answer is obtained (PN>PMIX), then the routine proceeds to step 418. Alternatively, if a YES answer is obtained, then the routine proceeds to step 416 wherein the output duration of the pressure-increasing signal TDW** is determined according to an equation below.

$$TDW^{}=-1KDW \cdot \log(PN^{}/Pb^{**}) \qquad (35)$$

The routine proceeds to step 417 wherein it is determined whether the output duration of the pressure-reducing signal TDW derived in step 416 is greater than KTDWMIN or not that is a minimum energization time of the solenoid of each of the actuators 21 to 24. If a NO answer is obtained meaning that there is the possibility of failure in operation of the solenoid resulting in an error in the antiskid brake control, the routine terminates without outputting the pressure-reducing signal TDW and updating the W/C pressure Pb. Alternatively, if a YES answer is obtained, then the routine proceeds to step 419 wherein the W/C pressure Pb is updated and set to the target brake pressure PN**.

After step 418 or 419, the routine proceeds to step 420 wherein the output duration of the pressure-increasing signal TDW derived in step 418 or 419 is set in the solenoid energization timer of the hydraulic servomechanism 70. The hydraulic servomechanism 70 outputs the pressure-reducing signal TDW to one of the actuators 21 to 24, thereby decreasing the W/C pressure in a corresponding one of the wheel cylinders 11 to 14.

FIGS. 18(a), 18(b), and 18(c) are time charts for explaining the antiskid brake operation in a case where the vehicle equipped with the antiskid brake system of this embodiment is braked during traveling at 70 Km/h.

FIG. 18(a) shows the wheel speed Vw, the estimated W/C pressure Pb, the transfer gain, and the phase delay φ. FIG. 18(b) shows the brake pressure change ΔPb and the change in wheel speed change ΔΔVw. FIG. 18(c) shows the inverses in sign of the brake pressure change ΔPb and the change in wheel speed change ΔΔVw from which offsets are removed, that is, {−(ΔΔVw−Mean(ΔΔVw))} and {ΔPb−Mean(ΔPb)}.

The phase delay φ is determined from values shown in FIG. 18(c). The change in wheel speed change ΔΔVw changes with a change in W/C pressure Pb and becomes delayed in phase. Based on this change in phase, the phase delay φ is determined. When the phase delay φ decreases below the threshold value φth, the pressure-holding mode is, as described above, entered, so that estimated W/C pressure Pb is kept constant. This minimizes a drop in wheel speed which is caused by the brake force exceeds the μ-peak brake force, thereby providing a suitable brake force under the antiskid brake control.

The antiskid brake system of this embodiment, as described above, uses the pressure-increasing pattern such as the one shown in FIG. 19(a), however, may employ another pattern as shown in FIG. 19(b) or 19 (c). In the pressure-increasing pattern of FIG. 19(b), a period of time during which four successive pulse signals outputted to one of the actuators 21 to 24 is defined as one pressure-increasing cycle. During one pressure-increasing cycle, the W/C pressure Pb is, in sequence, increased, increased, held, and increased. In the pressure-increasing pattern of FIG. 19(c), one pressure-increasing cycle is divided into three regular cycles in which the W/C pressure is stepped up.

In a case where it is possible to measure the brake pressure PM in the master cylinder 16 using a pressure sensor, the equations used in step 403 and 406 of FIG. 17 may be replaced with ones below.

$$PUPMAX^{}=Pb^{}+(PM-Pb^{**})EXP(-KUP\ Ts) \quad (36)$$

$$TUP^{}=-1/KUP \cdot \log((PM-PN^{})/(PM-Pb^{**})) \quad (37)$$

The above embodiment uses the W/C pressure Pb as a parameter reflecting on the brake torque, however, may employ another parameter reflecting on the brake torque or the brake torque itself.

It is advisable that the number of pulse signals or frequency thereof to be applied to the actuators 21 to 24 to increase the W/C pressure Pb in one control cycle, as shown in FIGS. 9, 10, 19(b), and 19(c), be limited to a specific value. Usually, the resonant vibration produced at a suspension system is mainly transmitted to each wheel. Such resonant vibration is caused by the resonance of the vehicle body or engine with the suspension system and has different frequencies between types of vehicles, usually 15 Hz to 40 Hz. The resonant frequency of 15 Hz is caused by the resonance of the vehicle in a vertical direction thereof. The resonant frequency of 40 Hz is caused by the resonance of the vehicle in a longitudinal direction thereof. It is, thus, advisable that the frequency of the pressure-increasing pulse signals provided to energize the actuators 21 to 24 be selected from a range excluding the resonance frequencies of 15 Hz to 40 Hz, thereby eliminating adverse effects of the resonant frequency in the suspension system on signals used to determine the brake pressure change ΔPb and the W/C pressure Pb and also minimizing the resonance of the W/C pressure or valves of the actuators 21 to 24 with the suspension system. Usually, it is impossible to apply forty pressure-increasing pulses to the actuators 21 to 24 because of the limit of response rate thereof. It is, thus, preferable that the frequency of the pressure-increasing pulses be less than 10 Hz.

The above described adverse effects of the resonant frequency in the suspension system may alternatively be eliminated by removing the resonant frequency from a sensor signal indicative of the wheel speed Vw using a band-pass filter or a low-pass filter. For instance, 15 Hz±5 Hz and 40 Hz±5 Hz are preferably removed from the sensor signal. Alternatively, only a component of the sensor signal within a range less than 15 Hz or more than 40 Hz may be employed to determine the wheel speed Vw. The removal of the resonance frequency from the sensor signal may also be performed when reducing the W/C pressure.

Each of the actuators 21 to 24, as illustrated in FIG. 12, is implemented by a three-position control valve, however, a two-position control valve designed to selectively increase and hold the W/C pressure may be employed. In this case, a pressure-reducing two-position control valve is installed between each of the actuators 21 to 24 and a corresponding one of the reservoirs 28a and 28b. Instead of the pressure-increasing two-position control valves, linear control valves may be employed which are each designed to move a valve body thereof linearly as a function of the amount of current supplied to a solenoid. In this case, it is advisable that the harmonic or great hydraulic pressure change occurring when the pressure-increasing pulse, as shown in FIGS. 9, 10, 19(b), and 19(c), rises be minimized to eliminate unwanted noises disturbing the calculation of the brake pressure change ΔPb. This may be achieved by smoothing an upper corner of a rising edge of each pressure-increasing pulse.

FIG. 20 shows a modification of the electronic control circuit 40 in FIG. 13 which is designed to eliminate the adverse effects of the resonant vibration occurring in the suspension system caused by traveling of the vehicle on steps or irregularities in the road.

A resonance-detecting circuit 96 detects resonant frequencies of 15 Hz and/or 40 Hz contained in the signal indicative of the wheel speed Vw and compares a gain of the vibration of the suspension system with a threshold value. If either of the gains is greater than the threshold value meaning that the vehicle is traveling on an uneven road surface, a switch 93 switches a connection of the pressure-increasing and -holding pattern selecting circuit 53 to the switch 71 to a connection of a pressure-increasing and -holding pattern selecting circuit 90 to the switch 71. The pressure-increasing and -holding pattern selecting circuit 90 produces a pressure-increasing pattern or a pressure-holding pattern which increases the rate at which the W/C pressure rises, thereby eliminating a lag in increasing the W/C pressure.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An antiskid brake system for a vehicle comprising:
a wheel speed determining circuit determining a speed of a wheel of the vehicle;
a parameter determining circuit determining a parameter reflecting on brake torque applied to the wheel of the vehicle;
a braking condition determining circuit comparing a phase of a change in speed of the wheel determined by said wheel speed determining circuit with a phase of a change in parameter determined by said parameter determining circuit to determine a phase delay of the change in speed of the wheel and determining a braking condition based on the phase delay; and
an antiskid brake controlling circuit performing antiskid brake control based on the braking condition determined by said braking condition determining circuit.

2. An antiskid brake system as set forth in claim 1, wherein said braking condition determining circuit increases the parameter in the form of a pulse and determines the braking condition the change in speed of the wheel as a function of a step change in the parameter.

3. An antiskid brake system as set forth in claim 1, wherein said braking condition determining circuit determines the braking condition based on a fact that the phase of the change in speed of the wheel is delayed from the phase of the change in parameter determined by the parameter determining circuit as a slip ratio increases.

4. An antiskid brake system as set forth in claim 1, wherein the parameter determined by said parameter determining circuit is a pressure of hydraulic fluid supplied cyclically to a wheel cylinder of the vehicle in the form of a pulse, and wherein a cycle in which the pressure of hydraulic fluid is supplied to the wheel cylinder is lower than a cycle of resonant vibrations occurring at a suspension system of the vehicle depending upon a type of the vehicle.

5. An antiskid brake system as set forth in claim 1, wherein said wheel speed determining circuit provides a signal indicative of the speed of the wheel to said braking condition determining circuit, and wherein a frequency higher than a frequency of resonant vibrations occurring in a suspension system of the vehicle is removed from the signal indicative of the speed of the wheel.

6. An antiskid brake system as set forth in claim 1, wherein the change in speed of the wheel is one of a first parameter representing a difference between instant values of the speed of the wheel sampled at a given time interval cyclically and a second parameter representing a difference between instant values of the first parameter sampled at the given time interval cyclically.

7. An antiskid brake system as set forth in claim 1, wherein the change in speed of the wheel is one of a first parameter that is a first difference between instant values of the speed of the wheel sampled at a given time interval cyclically minus a mean value of the first differences sampled for a given period of time and a second parameter that is a second difference between instant values of the first parameter sampled at the given time interval cyclically minus the second differences sampled for a given period of time.

8. An antiskid brake system as set forth in claim 1, wherein the change in parameter determined by said parameter determining circuit is a change in pressure of hydraulic fluid supplied to a wheel cylinder of the vehicle in a given period of time.

9. An antiskid brake system as set forth in claim 1, wherein the change in parameter determined by said parameter determining circuit is a change in pressure of hydraulic fluid supplied to a wheel cylinder of the vehicle in a given period of time minus a means values of the changes in pressure of the hydraulic fluid for a given period of time.

10. A braking condition determining device for a vehicle comprising:

a wheel speed determining circuit determining a speed of a wheel of the vehicle;

a parameter determining circuit determining a parameter reflecting on brake torque applied to the wheel of the vehicle; and a braking condition determining circuit comparing a phase of a change in speed of the wheel determined by said wheel speed determining circuit with a phase of a change in parameter determined by said parameter determining circuit to determine a phase delay of the change in speed of the wheel and determining a braking condition of the wheel based on the phase delay.

* * * * *